US012743171B2

(12) United States Patent
Yang

(10) Patent No.: US 12,743,171 B2
(45) Date of Patent: Sep. 22, 2026

(54) DRIVE CIRCUIT, TOUCH DRIVE APPARATUS, AND ELECTRONIC DEVICE

(71) Applicant: SHENZHEN GOODIX TECHNOLOGY CO., LTD., Shenzhen (CN)

(72) Inventor: Ming Yang, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 0 days.

(21) Appl. No.: 19/185,645

(22) Filed: Apr. 22, 2025

(65) Prior Publication Data

US 2025/0251822 A1 Aug. 7, 2025

Related U.S. Application Data

(63) Continuation of application No. PCT/CN2023/074918, filed on Feb. 8, 2023.

(51) Int. Cl.
*G06F 3/041* (2006.01)
*G06F 3/044* (2006.01)

(52) U.S. Cl.
CPC .......... *G06F 3/04164* (2019.05); *G06F 3/041* (2013.01); *G06F 3/044* (2013.01); *G06F 3/0446* (2019.05)

(58) Field of Classification Search
CPC ...... G06F 3/04164; G06F 3/041; G06F 3/044; G06F 3/0446
See application file for complete search history.

(56) References Cited

U.S. PATENT DOCUMENTS 8,624,870 B2 * 1/2014 Joharapurkar .... G06F 3/041662 345/173
10,088,510 B2 10/2018 Sawataishi
10,372,960 B2 * 8/2019 Wang ................. G06V 40/1306
11,029,792 B2 * 6/2021 Zhao ..................... G06F 3/0445
(Continued)

FOREIGN PATENT DOCUMENTS

CN 102113216 A 6/2011
CN 106980410 A 7/2017
(Continued)

OTHER PUBLICATIONS

International search report of PCT/CN2023/120752 issued by CNIPA on Nov. 15, 2023.
(Continued)

*Primary Examiner* — Michael J Jansen, II
(74) *Attorney, Agent, or Firm* — Emerson, Thomson & Bennett, LLC; Roger D. Emerson; Peter R. Detorre

(57) ABSTRACT

A drive circuit, a touch drive apparatus, and an electronic device are provided. The circuit comprises a first node, a second node, a ground node, a switch circuit, and an energy storage capacitor. The first node is configured to provide a first positive voltage. The second node is configured to provide a first negative voltage. The switch circuit is configured to control a first terminal of the energy storage capacitor to be selectively connected to the ground node or the drive electrode, and control a second terminal of the energy storage capacitor to be selectively connected to the ground node or the drive electrode. In one phase, the first terminal of the energy storage capacitor receives charges released from the drive electrode. In another phase, the second terminal of the energy storage capacitor charges the drive electrode using stored charges.

16 Claims, 14 Drawing Sheets

(56) References Cited

U.S. PATENT DOCUMENTS

| | | | | |
|---|---|---|---|---|
| 11,073,895 | B2 * | 7/2021 | Park | G06F 3/0446 |
| 11,301,093 | B2 * | 4/2022 | Yuan | G06F 3/03545 |
| 11,416,088 | B1 * | 8/2022 | Xie | H02J 7/345 |
| 11,611,333 | B1 * | 3/2023 | Jiang | G06F 3/044 |
| 11,947,753 | B2 * | 4/2024 | Huang | G06F 3/0416 |
| 2011/0074755 | A1 | 3/2011 | Brown et al. | |
| 2011/0261006 | A1 * | 10/2011 | Joharapurkar | H03K 17/96 345/174 |
| 2017/0116452 | A1 * | 4/2017 | Wang | G06V 40/1306 |
| 2017/0184645 | A1 | 6/2017 | Sawataishi | |
| 2019/0095032 | A1 * | 3/2019 | Park | G06F 1/3262 |
| 2019/0294301 | A1 * | 9/2019 | Zhao | G06F 3/0416 |
| 2021/0041984 | A1 | 2/2021 | Yuan et al. | |
| 2022/0035470 | A1 | 2/2022 | Jiang | |
| 2023/0384880 | A1 * | 11/2023 | Huang | G06F 3/0416 |

FOREIGN PATENT DOCUMENTS

| | | | | |
|---|---|---|---|---|
| CN | 110196653 | A | 9/2019 | |
| CN | 111801584 | A | 10/2020 | |
| CN | 111819451 | A | 10/2020 | |
| CN | 112860116 | A | 5/2021 | |
| CN | 112947790 | A | 6/2021 | |
| CN | 112965641 | A | 6/2021 | |
| CN | 115543127 | A | 12/2022 | |
| JP | 2019211898 | A | 12/2019 | |
| WO | WO2022021047 | A1 | 2/2022 | |
| WO | WO-2022183442 | A1 * | 9/2022 | G06F 3/041 |

OTHER PUBLICATIONS

International search report of PCT/CN2023/074918 issued by CNIPA on Oct. 25, 2023.

Zhang Jinfang, Chen Houjin, Qu Kongning, A self-cap and mutual-cap detection circuit for capacitive touch panel, Journal of Beijing Jiaotong University, vol. 40 No. 2, Apr. 2016.

Yu-Hsiang Yu,Tsung-Ying Sun, A novel noise suppression solution for low cost microcontroller-based touch panel: Using inverse charge transfer capacitive sensing method, 2014 IEEE 3rd Global Conference on Consumer Electronics (GCCE).

* cited by examiner

DRIVE CIRCUIT, TOUCH DRIVE APPARATUS, AND ELECTRONIC DEVICE

CROSS REFERENCE

The present disclosure is a continuation application of PCT/CN2023/074918, filed on Feb. 8, 2023 and entitled "DRIVE CIRCUIT, TOUCH DRIVE APPARATUS, AND ELECTRONIC DEVICE", which is incorporated herein by reference in its entirety.

TECHNICAL FIELD

Embodiments of the present disclosure relate to the technical field of touch control, and more specifically relate to a drive circuit, a touch drive apparatus, and an electronic device.

BACKGROUND

The touch screen is widely used in various electronic devices. The touch screen comprises a drive electrode and a detection electrode. By driving the drive electrode and receiving a signal sensed by a sensing electrode, capacitance change of the detection capacitor can be determined, and then a user operation can be ascertained. When the drive electrode is driven, the drive electrode obtains charges from a power supply, so that the drive electrode is charged to a target voltage, during which, energy of the power supply is consumed and power consumption is caused. The drive power consumption of the drive electrode is main power consumption of the touch screen. How to reduce the drive power consumption of the drive electrode is a problem to be urgently solved.

SUMMARY

In view of this, embodiments of the present disclosure provide a drive circuit, a touch drive apparatus, and an electronic device, to reduce the drive power consumption.

In a first aspect, an embodiment of the present disclosure provides a drive circuit, wherein the drive circuit is applicable to a touch screen comprising a drive electrode. The drive circuit comprises: a first node configured to provide a first positive voltage; a second node configured to provide a first negative voltage; a ground node; an energy storage capacitor comprising a first terminal and a second terminal; and a switch circuit configured to control the first terminal of the energy storage capacitor to be selectively connected to the ground node or the drive electrode, and control the second terminal of the energy storage capacitor to be selectively connected to the ground node or the drive electrode.

Optionally, the switch circuit is configured to control, in a first phase, the drive electrode to be connected to the first node to charge the drive electrode via the first node, so that voltage of the drive electrode equals the first positive voltage; control, in a second phase, the drive electrode to be connected to the first terminal of the energy storage capacitor to store charges released from the drive electrode in the energy storage capacitor, so that the voltage of the drive electrode equals a second positive voltage; control, in a third phase, the drive electrode to be connected to the ground node, so that the voltage of the drive electrode equals zero voltage; control, in a fourth phase, the drive electrode to be connected to the second terminal of the energy storage capacitor to transfer charges from the energy storage capacitor to the drive electrode, so that the voltage of the drive electrode equals a second negative voltage; and control, in a fifth phase, the drive electrode to be connected to the second node to charge the drive electrode via the second node, so that the voltage of the drive electrode equals the first negative voltage. The second positive voltage is lower than the first positive voltage and higher than the zero voltage; and the second negative voltage is higher than the first negative voltage and lower than the zero voltage.

Optionally, the switch circuit controls the second terminal of the energy storage capacitor to be connected to the ground node in the second phase; and the switch circuit controls the first terminal of the energy storage capacitor to be connected to the ground node in the fourth phase.

Optionally, the switch circuit is further configured to: control, in a sixth phase, the drive electrode to be connected to the second terminal of the energy storage capacitor to store the charges released from the drive electrode in the energy storage capacitor, so that the voltage of the drive electrode equals a third negative voltage; control, in a seventh phase, the drive electrode to be connected to the ground node, so that the voltage of the drive electrode equals the zero voltage; and control, in an eighth phase, the drive electrode to be connected to the first terminal of the energy storage capacitor to transfer charges from the energy storage capacitor to the drive electrode, so that the voltage of the drive electrode equals a third positive voltage. The switch circuit controls the first terminal of the energy storage capacitor to be connected to the ground node in the sixth phase; and the switch circuit controls the second terminal of the energy storage capacitor to be connected to the ground node in the eighth phase.

Optionally, the switch circuit comprises: an output node provided for connection to the drive electrode; a first switch provided between the first node and the output node; a second switch provided between the second node and the output node; a third switch provided between the ground node and the output node; a fourth switch provided between the ground node and the second terminal of the energy storage capacitor; a fifth switch provided between the ground node and the first terminal of the energy storage capacitor; a sixth switch provided between the ground node and the second terminal of the energy storage capacitor; and a seventh switch provided between the ground node and the first terminal of the energy storage capacitor.

Optionally, in the first phase, the first switch and the fourth switch are switched on, and the second switch, the third switch, the fifth switch, the sixth switch, and the seventh switch are switched off; in the second phase, the fourth switch and the seventh switch are switched on, and the first switch, the second switch, the third switch, the fifth switch, and the sixth switch are switched off; in the third phase, the third switch and the fifth switch are switched on, and the first switch, the second switch, the fourth switch, the sixth switch, and the seventh switch are switched off; in the fourth phase, the fifth switch and the sixth switch are switched on, and the first switch, the second switch, the third switch, the fourth switch. and the seventh switch are switched off; in the fifth phase, the second switch and the fifth switch are switched on, and the first switch, the third switch, the fourth switch, the sixth switch, and the seventh switch are switched off; in the sixth phase, the fifth switch and the sixth switch are switched on, and the first switch, the second switch, the third switch, the fourth switch, and the seventh switch are switched off; in the seventh phase, the third switch and the fourth switch are switched on, and the first switch, the second switch, the fifth switch, the sixth switch, and the seventh switch are switched off; and in the eighth phase, the fourth switch and the seventh switch are switched on, and the first switch, the second switch, the third switch, the fifth switch, and the sixth switch are switched off.

Optionally, the switch circuit controls the second terminal of the energy storage capacitor to be connected to the ground node in the second phase; and the switch circuit controls the first terminal of the energy storage capacitor to be connected to the second node in the fourth phase.

Optionally, the switch circuit is further configured to: control, in a sixth phase, the drive electrode to be connected to the second terminal of the energy storage capacitor to store the charges released from the drive electrode in the energy storage capacitor, so that the voltage of the drive electrode equals a third negative voltage; control, in a seventh phase, the drive electrode to be connected to the ground node, so that the voltage of the drive electrode equals zero voltage; and control, in an eighth phase, the drive electrode to be connected to the first terminal of the energy storage capacitor to transfer charges from the energy storage capacitor to the drive electrode, so that the voltage of the drive electrode equals a third positive voltage. The switch circuit controls the first terminal of the energy storage capacitor to be connected to the ground node in the sixth phase; and the switch circuit controls the second terminal of the energy storage capacitor to be connected to the first node in the eighth phase.

Optionally, the switch circuit comprises: an output node provided for connection to the drive electrode; a first switch provided between the first node and the output node; a second switch provided between the second node and the output node; a third switch provided between the ground node and the output node; a fourth switch provided between the ground node and the second terminal of the energy storage capacitor; a fifth switch provided between the ground node and the first terminal of the energy storage capacitor; a sixth switch provided between the ground node and the second terminal of the energy storage capacitor; a seventh switch provided between the ground node and the first terminal of the energy storage capacitor; an eighth switch provided between the second terminal of the energy storage capacitor and the first node; and a ninth switch provided between the first terminal of the energy storage capacitor and the second node.

Optionally, in the first phase, the first switch and the fourth switch are switched on, and the second switch, the third switch, the fifth switch, the sixth switch, the seventh switch, the eighth switch, and the ninth switch are switched off; in the second phase, the fourth switch and the seventh switch are switched on, and the first switch, the second switch, the third switch, the fifth switch, the sixth switch, the eighth switch, and the ninth switch are switched off; in the third phase, the third switch and the ninth switch are switched on, and the first switch, the second switch, the fourth switch, the fifth switch, the sixth switch, the seventh switch, and the eighth switch are switched off; in the fourth phase, the sixth switch and the ninth switch are switched on, and the first switch, the second switch, the third switch, the fourth switch, the fifth switch, the seventh switch, and the eighth switch are switched off; in the fifth phase, the second switch and the fifth switch are switched on, and the first switch, the third switch, the fourth switch, the sixth switch, the seventh switch, the eighth switch, and the ninth switch are switched off; in the sixth phase, the fifth switch and the sixth switch are switched on, and the first switch, the second switch, the third switch, the fourth switch, the seventh switch, the eighth switch, and the ninth switch are switched off; in the seventh phase, the third switch and the eighth switch are switched on, and the first switch, the second switch, the fourth switch, the fifth switch, the sixth switch, the seventh switch, and the ninth switch are switched off; and in the eighth phase, the seventh switch and the eighth switch are switched on, and the first switch, the second switch, the third switch, the fourth switch, the fifth switch, the sixth switch, and the ninth switch are switched off.

Optionally, a capacitance value of the energy storage capacitor is larger than an equivalent capacitance of the drive electrode to ground.

In a second aspect, an embodiment of the present disclosure provides a touch drive apparatus, comprising the drive circuit provided in the first aspect or any optional embodiment in the first aspect.

Optionally, the switch circuit of the drive circuit is formed on a bare chip, wherein the energy storage capacitor and the bare chip are encapsulated together, or the energy storage capacitor is arranged outside encapsulation of the bare chip.

In a third aspect, an embodiment of the present disclosure provides a touch drive apparatus, comprising a touch screen and a touch chip provided in the second aspect or an optional embodiment in the second aspect.

In one phase, the energy storage capacitor stores charges released from the drive electrode; and in another phase, the energy storage capacitor stores charges provided to the drive electrode to charge the drive electrode. Therefore, the above drive circuit reduces the power consumption, and reduces the drive power consumption. It is understandable that the above drive circuit is applied to each of the touch drive apparatus and the electronic device mentioned above. Therefore, the beneficial effects of the drive circuit may be referred to for the beneficial effects that can be achieved by the touch drive apparatus and the electronic device, which will not be repeated here.

BRIEF DESCRIPTION OF DRAWINGS

One or more embodiments are illustrated with reference to pictures in corresponding drawings, but these illustrations do not constitute any limitation to the embodiments. When the description below involves the drawings, like reference numerals refer to identical elements in different figures. Unless otherwise particularly stated, the figures in the drawings do not constitute a limitation of scale.

DETAILED DESCRIPTION

Technical solutions in embodiments of the present disclosure will be clearly and completely described below with reference to the drawings. Apparently, the embodiments described below are a part, instead of all, of the embodiments of the present disclosure.

The terms used in the present disclosure are intended merely to describe particular embodiments, and are not intended to limit the present disclosure. The singular forms of "a" and "the" used in the present disclosure and the appended claims are also intended to include plural forms, unless the context clearly indicates other meanings. It should be further understood that the term "and/or" used herein refers to and includes any or all possible combinations of one or more associated listed items.

In addition, the terms such as "first" and "second" are only used for distinguishing between similar objects, and cannot be understood as indicating or implying relative importance or implicitly indicating the number of indicated technical features. Thus, features defined with "first," "second," or the like may explicitly or implicitly include one or more of the features.

Embodiments of the present disclosure provide a drive circuit, a touch drive apparatus, and an electronic device. The drive circuit may be applied to a touch screen comprising a drive electrode. The drive circuit drives the drive electrode to implement the touch detection function. The drive circuit comprises a switch circuit and an energy storage capacitor. The switch circuit is configured to control a first terminal of the energy storage capacitor to be selectively connected to a ground node or the drive electrode, and control a second terminal of the energy storage capacitor to be selectively connected to the ground node or the drive electrode. In one phase, the first terminal of the energy storage capacitor is connected to the drive electrode, to store charges released from the drive electrode. In another phase, the second terminal of the energy storage capacitor is connected to the drive electrode, and the charges stored in the energy storage capacitor are transferred to the drive electrode to charge the drive electrode. Therefore, the time for charging the drive electrode using a power supply is reduced, the power consumption of the power supply is reduced, the drive power consumption of the drive electrode is reduced, and the power consumption of the touch screen is reduced.

Figure 1:
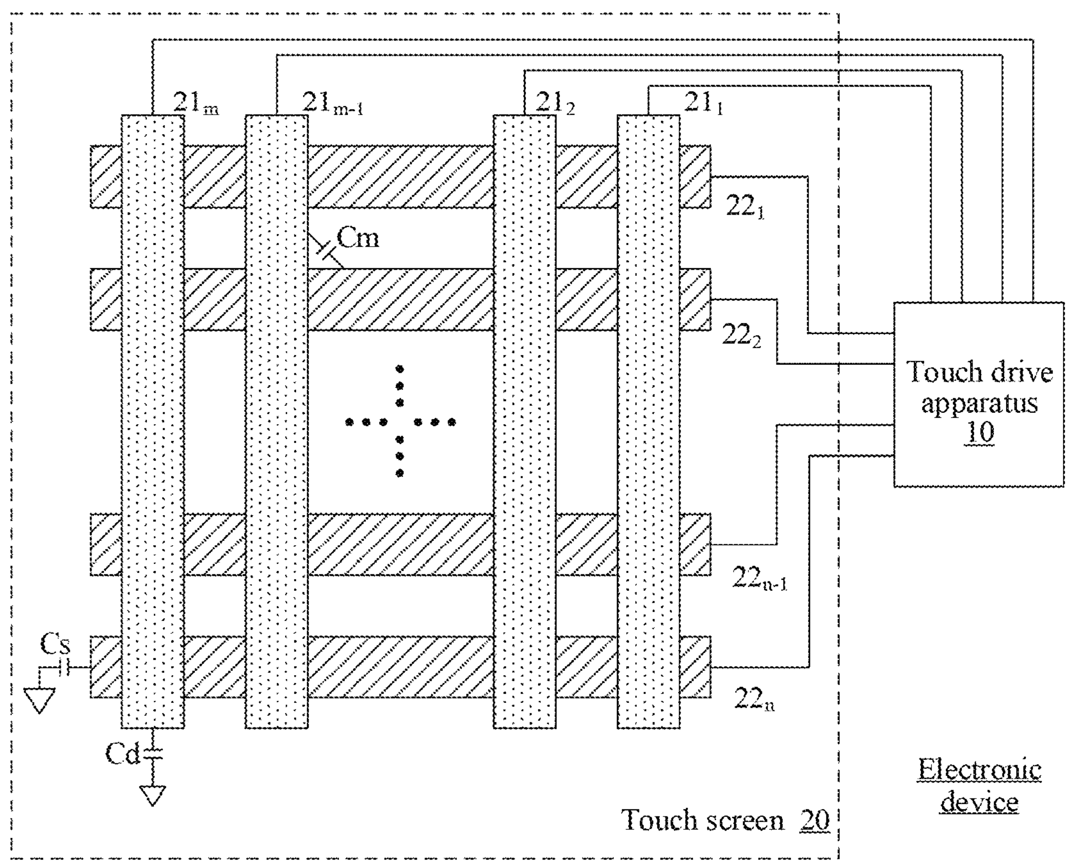
FIG. 1 is a schematic block diagram of an electronic device provided in an embodiment of the present disclosure.

FIG. 1 is a block diagram of an example electronic device. As shown in FIG. 1, the electronic device comprises a touch screen 20 and a touch drive device 10. As an example and non-restrictively, the electronic device may be a portable or mobile computing device, such as a terminal device, a mobile phone, a tablet computer, a notebook computer, a desktop computer, a game device, a vehicle electronic device, or a wearable smart device, or may be other electronic devices, such as an electronic database, an automobile, or an automated teller machine (ATM) of a bank. The wearable smart device includes a device that has complete functions and a large size, and can realize complete or partial functions without relying on a smart phone, such as a smart watch or smart glasses, and a device that only focuses on a certain type of application functions and needs to be used in cooperation with other devices such as a smart phone, for example, various smart bracelets and smart jewelries for monitoring physical signs.

The electronic device may further comprise a display screen. The display screen includes, but is not limited to, a liquid crystal display (LCD), an organic light emitting diode (OLED) display screen, a plasma (PDP) display screen, and a cathode ray tube (CRT) display screen.

The touch screen 20 comprises first electrodes $\mathbf{21}_1$-$\mathbf{21}_m$ extending along a first direction and second electrodes $\mathbf{22}_1$-$\mathbf{22}_n$ extending along a second direction. The first direction is, for example, a longitudinal direction, and the second direction is, for example, a transverse direction. The first electrodes $\mathbf{21}_1$-$\mathbf{21}_m$ have ground self-capacitance Cd, and the second electrodes $\mathbf{22}_1$-$\mathbf{22}_n$ have ground self-capacitance Cs. There is mutual capacitance Cm between the first electrodes $\mathbf{21}_1$-$\mathbf{21}_m$ and the second electrodes $\mathbf{22}_1$-$\mathbf{22}_n$. In FIG. 1, the self-capacitance Cd of the first electrode $\mathbf{21}_m$, the self-capacitance Cs of the second electrode $\mathbf{22}_n$, and the mutual capacitance Cm between the first electrode $\mathbf{21}_{m-1}$ and the second electrode 222 are taken as examples. When a conductor, such as a human hand, touches the touch screen, capacitance values of the self-capacitance and the mutual capacitance change. The touch screen 20 can implement touch detection by self-capacitance detection and mutual capacitance detection.

During self-capacitance detection, the touch chip 10 provides a drive signal to the first electrode $\mathbf{21}_i$ ($1 \le i \le m$) and detects the change of the self-capacitance Cd (i.e., detection capacitance) of the first electrode $\mathbf{21}_i$. The first electrode $\mathbf{21}_i$ is both a drive electrode and a detection electrode. In addition, the touch chip 10 provides a drive signal to the second electrode $\mathbf{22}_j$ ($1 \le j \le n$), and detects the change of the self-capacitance Cs (i.e., detection capacitance) of the second electrode $\mathbf{22}_j$. The second electrode $\mathbf{22}_j$ is both a drive electrode and a detection electrode. A touch operation of a user is identified based on the changes of the self-capacitance Cd of the first electrode $\mathbf{21}_j$ and the self-capacitance Cs of the second electrode $\mathbf{22}_j$.

During mutual capacitance detection, the first electrode $\mathbf{21}_i$ and the second electrode $\mathbf{22}_j$ are used as the drive electrode and the detection electrode respectively, and the mutual capacitance Cm of the first electrode $\mathbf{21}_i$ and the second electrode $\mathbf{22}_j$ are used as the detection capacitance. The touch chip 10 provides a drive signal to the first electrode $\mathbf{21}_1$-$\mathbf{21}_m$ and receives a detection signal from the second electrode $\mathbf{22}_1$-$\mathbf{22}_n$ to detect the change of the mutual capacitance Cm. The touch operation of the user is identified based on the change of the mutual capacitance C1.

Therefore, during self-capacitance detection, the first electrode $\mathbf{21}_i$ and the second electrode $\mathbf{22}_j$ are not only drive electrodes but also detection electrodes; while during mutual capacitance detection, the first electrode $\mathbf{21}_i$ is a drive electrode, and the second electrode $\mathbf{22}_j$ is a detection electrode. The description is provided below with mutual capacitance detection as an example.

Figure 2:
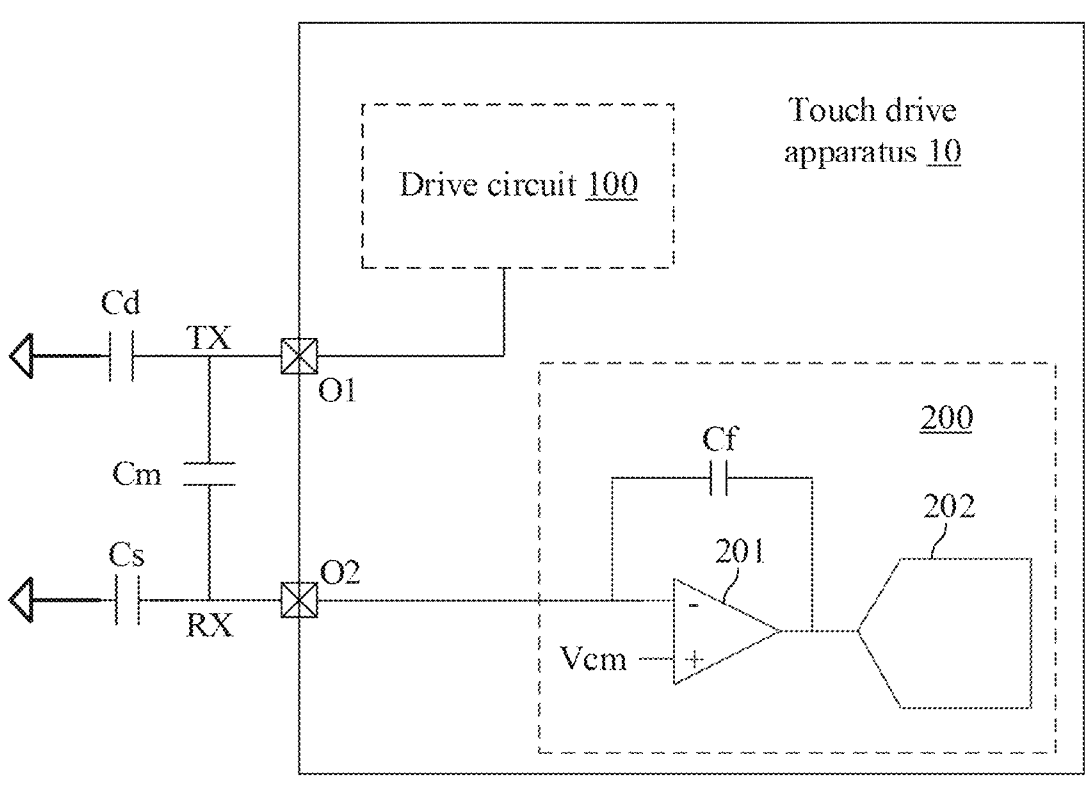
FIG. 2 is a schematic diagram of a touch drive apparatus provided in an embodiment of the present disclosure.

FIG. 2 is a schematic block diagram of a touch drive apparatus in an embodiment of the present disclosure. A touch chip 10 comprises a drive circuit 100 and a detection circuit 200. The drive circuit 100 provides a drive signal to a drive electrode TX through a pin O1. The detection circuit 200 receives a detection signal from a detection electrode RX through a pin O2, amplifies the detection signal, and converts the amplified signal into a digital signal. The drive electrode TX is, for example, first electrodes $\mathbf{21}_1$-$\mathbf{21}_m$, and the detection electrode RX is, for example, second electrodes $\mathbf{22}_1$-$\mathbf{22}_n$.

The detection circuit 200 is, for example, a circuit based on a trans-impedance amplifier. The detection circuit 200 comprises an operational amplifier 201 and an analog-to-digital converter 202. A non-inverting input terminal of the operational amplifier 201 is connected with a common mode voltage V cm, an inverting input terminal is connected to the detection electrode, and a feedback capacitor Cf is provided between the inverting input terminal and an output terminal. A signal gain of the detection circuit 200 is Cm/Cf. When a finger touches the touch screen 20, the mutual capacitance Cm decreases, and output of the operational amplifier 201 decreases.

The process of providing a drive signal to the drive electrode TX of the touch screen 200 by the drive circuit 100 is also referred to as driving operation. The providing the drive signal to the drive electrode TX by the drive circuit 100 includes charging and discharging the drive electrode TX so that the drive electrode TX is at a target voltage. The detection circuit 20 can detect the capacitance value change of the mutual capacitance Cm at different coordinates of the touch screen 200. In the driving process, the drive circuit 100 enables the voltage of the drive electrode to reach a first positive voltage VCC and a first negative voltage VSS successively. The driving process will consume energy (charges) of a power supply (such as a battery) and cause power consumption at the drive circuit 100 and the drive electrode. The quantity of electric charges required to enable the drive electrode TX to be at the first positive voltage VCC or the first negative voltage VSS depends on the magnitude of the equivalent capacitance Cd (also referred to as load capacitance) of the drive electrode TX to ground. With reference to FIGS. 1 and 2, the drive circuit 100 may drive the first electrodes $\mathbf{21}_1$-$\mathbf{21}_m$ one by one, or may drive the first electrodes $\mathbf{21}_1$-$\mathbf{21}_m$ groupwise by driving the first electrode in each group simultaneously or driving the first electrodes $\mathbf{21}_1$-$\mathbf{21}_m$ simultaneously.

The touch screen 200 is generally used in cooperation with a display screen. The touch screen 200 is located above the display screen. The display screen is, for example, an OLED display screen. Cathode layer of the OLED display screen is grounded. The equivalent capacitance Cd of the drive electrode TX to ground is the capacitance between the drive electrode TX and the cathode layer of the OLED display screen. As the display screen evolves from a hard screen to a flexible screen and then to a foldable screen, the Thin Film Encapsulation (TFE) layer of the display screen becomes thinner and thinner, the distance between the drive electrode TX and the cathode layer of the OLED display screen becomes smaller and smaller, and the capacitance between the drive electrode TX and the cathode layer of the OLED display screen becomes larger and larger, so that an increasingly large quantity of electric charges are required to enable the drive electrode TX to be at the first positive voltage VCC or the first negative voltage VSS, and increasingly high power consumption is required to drive the drive electrode TX.

Figure 3:
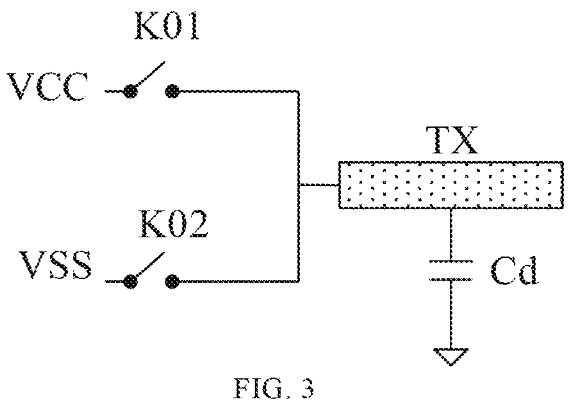
FIG. 3 is a schematic diagram of a drive circuit of related art.
Figure 4:
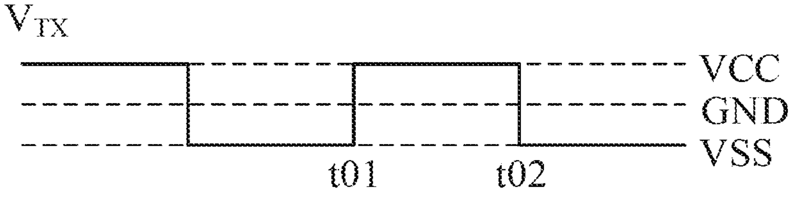
FIG. 4 is a schematic waveform diagram of a drive signal provided by the drive circuit shown in FIG. 3.

FIG. 3 is a schematic diagram of a drive circuit of related art. FIG. 4 is a schematic waveform diagram of a drive signal provided by the drive circuit shown in FIG. 3. The drive circuit comprises a switch K01 and a switch K02. The switch K01 is arranged between a terminal providing a first positive voltage VCC and a drive electrode TX. The switch K02 is arranged between a terminal providing a first negative voltage VSS and the drive electrode TX. Capacitance Cd is the equivalent capacitance of the drive electrode TX to ground. As shown in FIGS. 3 and 4, at time t01, the switch K01 is switched on, and the switch K02 is switched off, so that the drive circuit 100 charges the drive electrode TX to the first positive voltage VCC through the switch K01; while at time t02, the switch K01 is switched off, and the switch K02 is switched on, so that the drive circuit 100 charges the drive electrode TX to the first negative voltage VSS through the switch K02. For the drive circuit of FIG. 3, a power supply is required to provide charges in each of the process of changing the drive electrode TX from the first negative voltage VSS to the first positive voltage VCC and the process of changing the drive electrode TX from the first positive voltage VCC to the first negative voltage VSS, thus consuming energy of the power supply.

Figure 5:
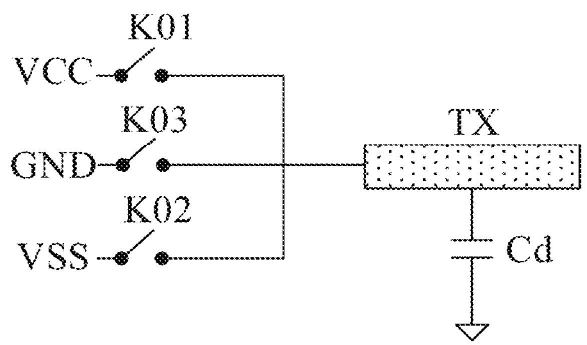
FIG. 5 is a schematic diagram of another drive circuit of related art.
Figure 6:
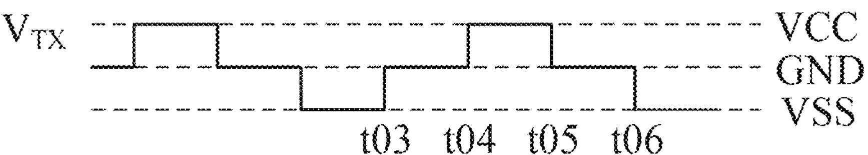
FIG. 6 is a schematic waveform diagram of a drive signal provided by the drive circuit shown in FIG. 5.

FIG. 5 is a schematic diagram of another drive circuit of related art. FIG. 6 is a schematic waveform diagram of a drive signal provided by the drive circuit shown in FIG. 5. The drive circuit comprises a switch K01, a switch K02, and a switch K03. The switch K01 is arranged between a terminal providing a first positive voltage VCC and a drive electrode TX. The switch K02 is arranged between a terminal providing a first negative voltage VSS and the drive electrode TX. The switch K03 is arranged between a ground node GND and the drive electrode TX. As shown in FIGS. 5 and 6, at time t03, the switch K03 is switched on, the switch K01 and the switch K02 are switched off, the drive electrode TX is connected to the ground node GND, negative charges on the drive electrode TX are released to the ground node GND, and the drive electrode TX increases from the first negative voltage VSS to 0V. At time t04, the switch K01 is switched on, the switch K02 and the switch K03 are switched off, and the first positive voltage VCC provides positive charges to the drive electrode TX, so that the drive electrode TX is charged from 0V to the first positive voltage VCC. At time t05, the switch K03 is switched on, the switch K01 and the switch K02 are switched off, positive charges on the drive electrode TX are released to the ground node GND through the switch K03, and the voltage of the drive electrode TX decreases to 0V. At time t06, the switch K02 is switched on, the switches K01 and K03 are switched off, the first negative voltage VSS provides negative charges to the drive electrode TX, and the voltage of the drive electrode TX decreases to the first negative voltage VSS. For the drive circuit of FIG. 5, charges on the drive electrode TX are discharged to the ground in the process of changing the drive electrode TX from the first positive voltage VCC to 0V and the process of changing the drive electrode TX from the first negative voltage VSS to 0V, without consuming energy of a power supply. However, fundamental component of the drive signal of the drive circuit shown in FIG. 5 is lower than fundamental component of the drive signal of the drive circuit shown in FIG. 3, which will reduce the magnitude of demodulated signal.

Figure 7:
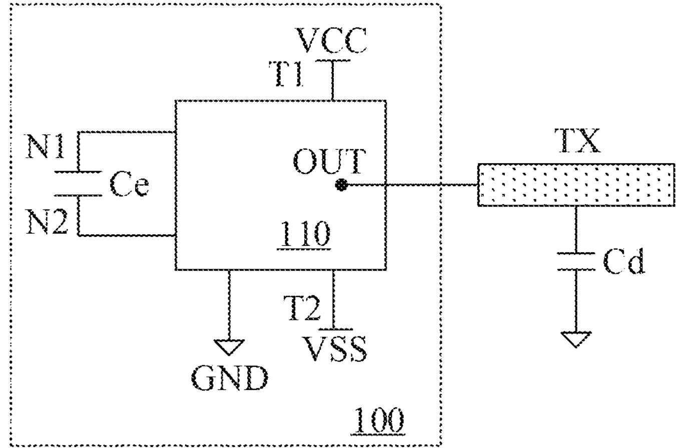
FIG. 7 is a schematic block diagram of a drive circuit provided in an embodiment of the present disclosure.

The present disclosure provides a drive circuit of a touch screen to reduce power consumption of the driving process. FIG. 7 is a schematic diagram of a drive circuit provided in an embodiment of the present disclosure. As shown in FIG.

7, the drive circuit 100 comprises: a first node T1, a second node T2, a ground node GND, a switch circuit 110, and an energy storage capacitor Ce. The first node T1 is configured to provide a first positive voltage VCC. The second node T2 is configured to provide a first negative voltage VSS. The energy storage capacitor Ce comprises a first terminal N1 and a second terminal N2. The switch circuit 110 has an output node OUT, the output node OUT is arranged to be connected to a drive electrode TX, the switch circuit 110 controls the connection or disconnection of the drive electrode and the energy storage capacitor Ce, the switch circuit 110 controls a first terminal N1 of the energy storage capacitor Ce to be selectively connected to the ground node GND or the drive electrode, and the switch circuit 110 controls a second terminal N2 of the energy storage capacitor Ce to be selectively connected to the ground node GND or the drive electrode. Specifically, the switch circuit 110 controls the drive electrode to be connected to the first terminal of the energy storage capacitor Ce, and controls the second terminal of the energy storage capacitor Ce to be connected to the ground node GND; the switch circuit 110 controls the drive electrode to be connected to the second terminal of the energy storage capacitor Ce, and controls the first terminal of the energy storage capacitor Ce to be connected to the ground node GND or the second node T2; and the capacitance of the energy storage capacitor Ce is greater than equivalent capacitance Cd of the drive electrode TX to ground. For example, the capacitance value of the energy storage capacitor Ce is greater than or equals 50 times as much as the capacitance value of the equivalent capacitance Cd of the drive electrode TX to ground. In the present disclosure, the energy storage capacitor recycles and releases charges on the drive electrode through the connection mode of the drive circuit, thereby reducing the power consumption in the driving process.

Timing sequence of the drive circuit of the present disclosure may include five phases, namely a first phase, a second phase, a third phase, a fourth stage, and a fifth phase. In the first phase, the switch circuit 110 controls the drive electrode TX to be connected to the first node T1, to charge the drive electrode TX via the first node T1, so that voltage of the drive electrode TX equals the first positive voltage VCC. In the second phase, the switch circuit 110 controls the drive electrode TX to be connected to the first terminal N1 of the energy storage capacitor Ce, to store charges released from the drive electrode TX in the energy storage capacitor Ce, so that the voltage of the drive electrode TX equals a second positive voltage. In the third phase, the switch circuit 110 controls the drive electrode TX to be connected to the ground node GND, so that the voltage of the drive electrode TX equals zero voltage. In the fourth phase, the switch circuit 110 controls the drive electrode TX to be connected to the second terminal N2 of the energy storage capacitor Ce, to transfer charges from the energy storage capacitor Ce to the drive electrode TX, so that the voltage of the drive electrode TX equals a second negative voltage. In the fifth phase, the switch circuit 110 controls the drive electrode TX to be connected to the second node T2, to charge the drive electrode TX via the second node T2, so that the voltage of the drive electrode TX equals the first negative voltage VSS. The second positive voltage is lower than the first positive voltage VCC and higher than the zero voltage; while the second negative voltage is higher than the first negative voltage VSS and lower than the zero voltage.

In the second phase, the energy storage capacitor Ce stores the charges released from the drive electrode TX during discharging, and in the fourth phase, the energy storage capacitor Ce transfers the stored charges to the drive electrode TX. That is, in the fourth stage, the drive circuit charges the drive electrode TX using the charges stored in the energy storage capacitor Ce. The drive circuit provided in the present disclosure saves charges of the power supply, reduces the power consumption, and improves the running time of the electronic device.

Further, based on the above five phases, the timing sequence of the drive circuit of the present disclosure may further include a sixth stage, a seventh stage, and an eighth stage. In the sixth phase, the switch circuit 110 controls the drive electrode TX to be connected to the second terminal N2 of the energy storage capacitor Ce, to store the charges released from the drive electrode TX in the energy storage capacitor Ce, so that the voltage of the drive electrode TX equals a third negative voltage; in the seventh phase, the switch circuit 110 controls the drive electrode TX to be connected to the ground node GND, so that the voltage of the drive electrode TX equals the zero voltage; and in the eighth phase, the switch circuit 110 controls the drive electrode TX to be connected to the first terminal N1 of the energy storage capacitor Ce, to transfer charges from the energy storage capacitor Ce to the drive electrode TX, so that the voltage of the drive electrode TX equals a third positive voltage.

In the sixth phase, the energy storage capacitor Ce stores the charges released from the drive electrode TX during discharging, and in the eighth phase, the energy storage capacitor Ce transfers the stored charges to the drive electrode TX. That is, in the eighth stage, the drive electrode TX is charged using the charges stored in the energy storage capacitor Ce, thereby saving charges of the power supply, reducing the power consumption, and improving the running time of the electronic device.

Figure 8:
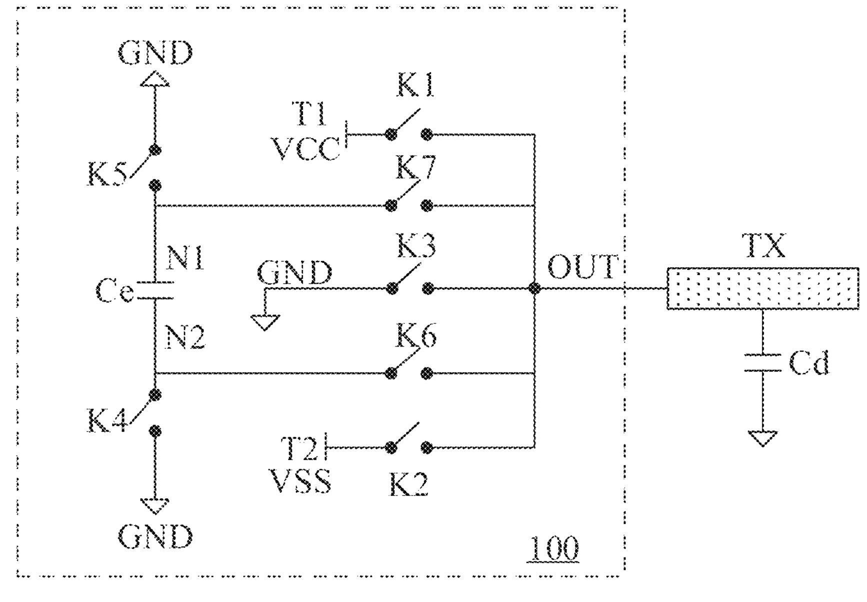
FIG. 8 is a schematic circuit diagram of a drive circuit provided in an embodiment of the present disclosure.

FIG. 8 is a schematic diagram of a drive circuit provided in an embodiment of the present disclosure. As shown in FIG. 8, the drive circuit 100 comprises: a first node T1, a second node T2, a ground node GND, a switch circuit, and an energy storage capacitor Ce. The switch circuit comprises: an output node OUT, a first switch K1, a second switch K2, a third switch K3, a fourth switch K4, a fifth switch K5, a sixth switch K6, and a seventh switch K7. The energy storage capacitor Ce is a discrete capacitor, such as a ceramic capacitor.

The first node T1 is configured to provide a first positive voltage VCC. The first node T1 is, for example, connected to a first voltage generation circuit, which is configured to generate the first positive voltage VCC. The first voltage generation circuit is connected to a power supply to generate the first positive voltage VCC based on the power supply voltage. The first voltage generation circuit is, for example, a DC-DC circuit or a Low Dropout Regulator. The second node T2 is configured to provide a first negative voltage VSS. The second node T2 is, for example, connected to a second voltage generation circuit, which is configured to generate the first negative voltage VSS. The second voltage generation circuit is connected to a power supply or the first voltage generation circuit, to generate the first negative voltage VSS based on the power supply voltage or the first positive voltage VCC. The second voltage generation circuit is, for example, a negative voltage charge pump. The absolute value of the first negative voltage VSS is, for example, equal to the absolute value of the first positive voltage VCC. The output node OUT is connected to the drive electrode TX for outputting a drive signal, that is, charging and discharging the drive electrode TX.

One terminal of the first switch K1 is connected to the first node T1, and the other terminal is connected to the output node OUT. The first switch K1 is configured to charge the drive electrode TX to the first positive voltage VCC. One terminal of the second switch K2 is connected to the second node T2, and the other terminal is connected to the output node OUT. The second switch K2 is configured to charge the drive electrode TX to the first negative voltage VSS. One terminal of the third switch K3 is connected to the ground node GND, and the other terminal is connected to the output node OUT. The third switch K3 is configured to discharge the drive electrode TX to 0V.

The energy storage capacitor Ce comprises a first terminal N1 and a second terminal N2. One terminal of the fourth switch K4 is connected to the ground node GND, and the other terminal is connected to the second terminal N2 of the energy storage capacitor Ce.

When the fourth switch K4 is switched on, the second terminal N2 of the energy storage capacitor Ce is set to 0V. One terminal of the fifth switch K5 is connected to the ground node GND, and the other terminal is connected to the first terminal N1 of the energy storage capacitor Ce. When the fifth switch K5 is switched on, the first terminal N1 of the energy storage capacitor Ce is set to 0V. One terminal of the sixth switch K6 is connected to the second terminal N2 of the energy storage capacitor Ce, and the other terminal is connected to the output node OUT. One terminal of the seventh switch K7 is connected to the first terminal N1 of the energy storage capacitor Ce, and the other terminal is connected to the output node OUT.

The energy storage capacitor Ce stores charges released from the drive electrode TX in one phase, and releases charges to the drive electrode TX in another phase. The sixth switch K6 and the seventh switch K7 are charge transfer paths between the energy storage capacitor Ce and the drive electrode TX.

The first switch K1, the second switch K2, the third switch K3, the fourth switch K4, the fifth switch K5, the sixth switch K6, and the seventh switch K7 include one or more transistors. For example, the first to seventh switches K1 to K7 may be implemented by a PMOS or an NMOS respectively, or the first to seventh switches K1 to K7 may be implemented by a combination of PMOS/NMOS. The manner of implementing the first to seventh switches K1 to K7 is not limited in the present disclosure.

The first switch K1, the second switch K2, the third switch K3, the fourth switch K4, the fifth switch K5, the sixth switch K6, and the seventh switch K7 are switched on and off under the control of corresponding control signals.

Figure 9:
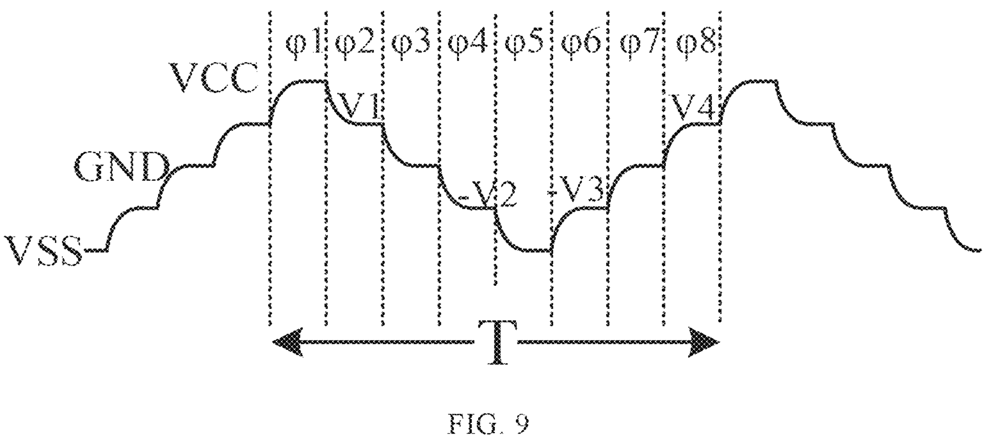
FIG. 9 is a schematic waveform diagram of a drive signal provided by the drive circuit shown in FIG. 8.
Figure 10A:
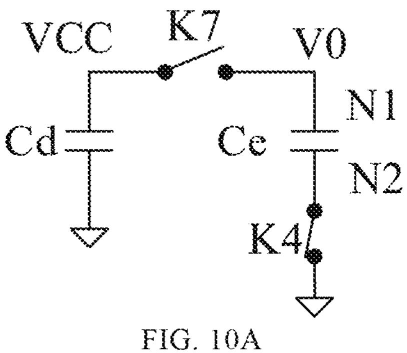
FIGS. 10A to 10I are schematic principle diagrams of a process of driving the drive circuit shown in FIG. 8.
Figure 10B:
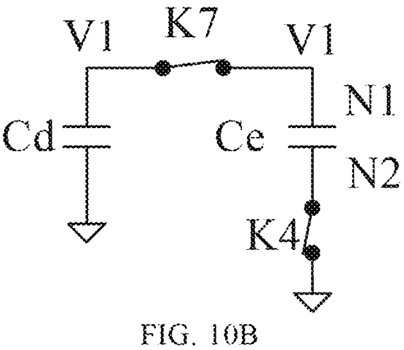
Figure 10C:
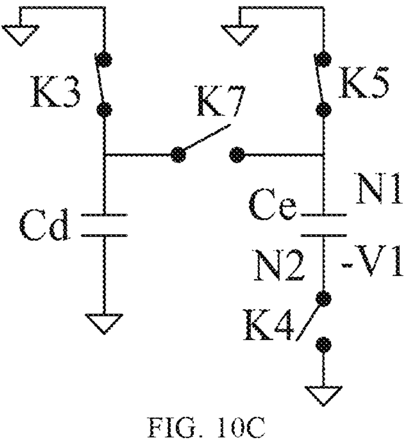
Figure 10D:
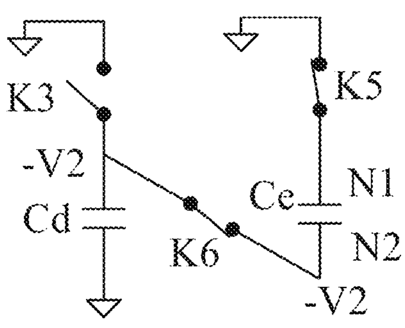
Figure 10E:
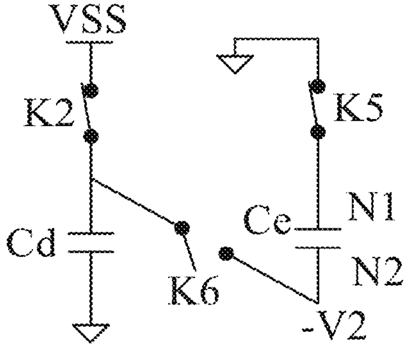
Figure 10F:
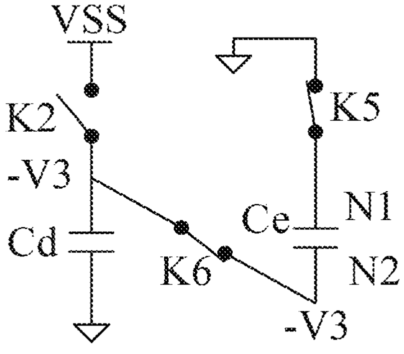
Figure 10G:
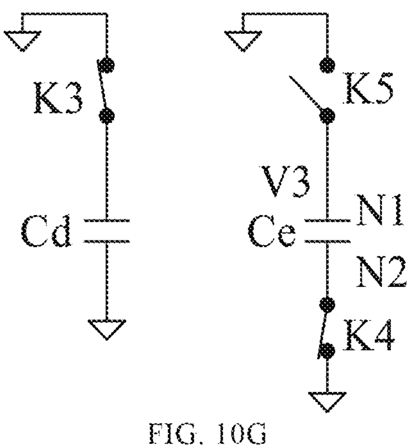
Figure 10H:
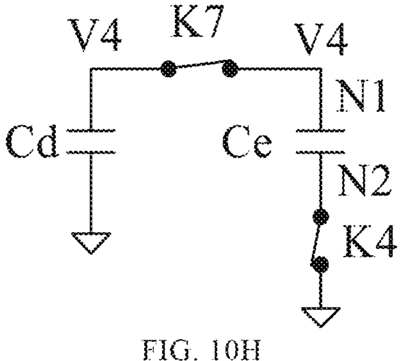
Figure 10I:
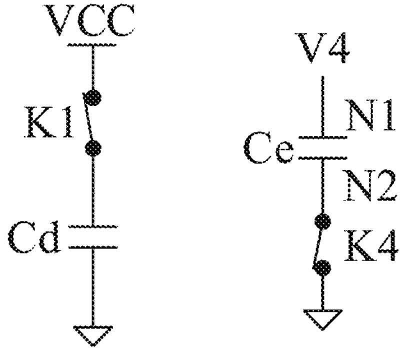
Figure 11:
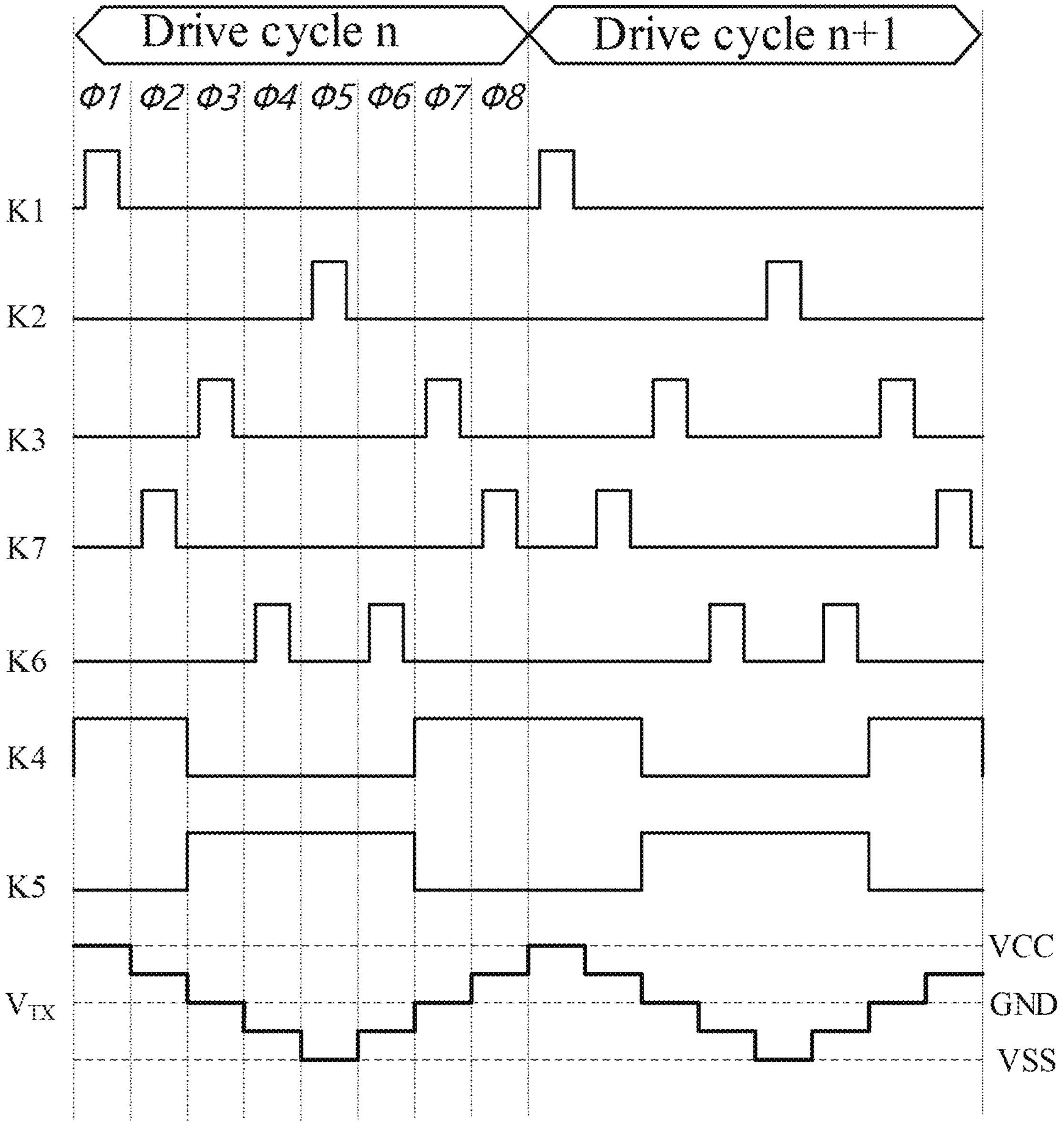
FIG. 11 is a timing diagram of the drive circuit shown in FIG. 8.

FIG. 9 is a schematic waveform diagram of a drive signal provided by the drive circuit shown in FIG. 8. Specifically, FIG. 9 is a waveform after the drive signal is stable. As shown in FIG. 9, one cycle T of a process of driving the drive electrode TX by the drive circuit 100 includes 8 phases φ1-φ8. A switch circuit controls the first terminal of the energy storage capacitor to be selectively connected to the ground node or the drive electrode respectively in different phases, and controls the second terminal of the energy storage capacitor to be selectively connected to the ground node or the drive electrode respectively in different phases. For example, the switch circuit controls, in a sixth phase of a cycle T, the first terminal of the energy storage capacitor to be selectively connected to the ground node, and the switch circuit controls, in a second phase of a cycle T, the first terminal of the energy storage capacitor to be selectively connected to the drive electrode; while the switch circuit controls, in an eighth phase of a cycle T, the second terminal of the energy storage capacitor to be connected to the ground node, and the switch circuit controls, in a fourth phase of a cycle T, the second terminal of the energy storage capacitor to be connected to the drive electrode. FIGS. 10A to 10I are schematic diagrams of a driving principle of the drive circuit shown in FIG. 8. FIG. 11 is a timing diagram of the drive circuit shown in FIG. 8. When a high signal corresponds to a switch, it means that the switch is switched on, while when a low signal corresponds to a switch, it means that the switch is switched off. A process of driving the drive electrode TX by the drive circuit 100 is described below with reference to FIGS. 8 to 11.

In a first phase φ1, the first switch K1 and the fourth switch K4 are switched on, and the second switch K2, the third switch K3, the fifth switch K5, the sixth switch K6 and the seventh switch K7 are switched off. As shown in FIG. 10A, the first node T1 provides positive charges to the drive electrode TX through the first switch K1, to charge the drive electrode TX to the first positive voltage VCC. The second terminal N2 of the energy storage capacitor Ce is grounded. The first terminal N1 of the energy storage capacitor Ce has voltage V0 in the first phase φ1. At the end of the first phase φ1, the voltage of the drive electrode TX is the first positive voltage VCC. In the first phase φ1, the drive electrode TX obtains positive charges from the first node T1, so that the driving process consumes energy of the power supply.

In a second phase φ2, the seventh switch K7 and the fourth switch K4 are switched on, and the first switch K1, the second switch K2, the third switch K3, the fifth switch K5, and the sixth switch K6 are switched off. As shown in FIG. 10B, the fourth switch K4 is switched on, and the second terminal N2 of the energy storage capacitor Ce is grounded. The seventh switch K7 is switched on, and the first terminal N1 of the energy storage capacitor Ce is connected to the drive electrode TX. The voltage VCC of the drive electrode TX is higher than the voltage V0 of the first terminal N1 of the energy storage capacitor Ce, and positive charges on the drive electrode TX are transferred to the first terminal N1 of the energy storage capacitor Ce via the seventh switch K7. The voltage of the drive electrode TX decreases to a first positive voltage V1, and the voltage of the first terminal N1 of the energy storage capacitor Ce increases to the first positive voltage V1. That is, VCC>V1>V0. The second phase φ2 is a charge storage phase of the energy storage capacitor Ce. According to the charge conservation principle, VCC*Cd+V0*Ce=V1*Cd+V1*Ce (formula 1). The first switch K1 and the second switch K2 are switched off, so that the drive circuit 100 does not consume energy of the power supply in the second phase φ2.

In a third phase φ3, the third switch K3 and the fifth switch K5 are switched on, and the first switch K1, the second switch K2, the fourth switch K4, the sixth switch K6, and the seventh switch K7 are switched off. As shown in FIG. 10C, remaining positive charges on the drive electrode TX are released to the ground through the third switch K3, and the voltage of the drive electrode TX becomes 0. The fourth switch K4 is switched off, the fifth switch K5 is switched on, the voltage of the first terminal N1 of the energy storage capacitor Ce becomes 0, the voltage difference between the first terminal N1 and the second terminal N2 of the energy storage capacitor Ce remains unchanged, and the voltage of the second terminal N2 becomes a negative voltage −V1. The drive circuit 100 does not consume energy of the power supply in the third phase φ3.

In a fourth phase φ4, the fifth switch K5 and the sixth switch K6 are switched on, and the first switch K1, the second switch K2, the third switch K3, the fourth switch K4, and the seventh switch K7 are switched off. The fifth switch K5 is switched on, and the voltage of the first terminal N1 of the energy storage capacitor Ce remains at zero voltage. The sixth switch K6 is switched on, and the second terminal N2 of the energy storage capacitor Ce is connected to the drive electrode TX. The voltage (zero voltage) of the drive electrode TX is higher than the voltage (negative voltage −V1) of the second terminal N2 of the energy storage capacitor Ce, and negative charges of the second terminal N2 of the energy storage capacitor Ce are transferred to the drive electrode TX via the sixth switch K6 until the second terminal N2 of the energy storage capacitor Ce and the drive electrode TX have an equal voltage. As shown in FIG. 10D, the voltage of the drive electrode TX decreases to a second negative voltage −V2, and the voltage of the second terminal N2 of the energy storage capacitor Ce also becomes the second negative voltage −V2, wherein −V1<−V2. According to the charge conservation, $V1*Ce=V2*Cd+V2*Ce$ (formula 2). That is, the fourth phase φ4 is a charge release phase of the energy storage capacitor Ce. The drive circuit 100 does not consume energy of the power supply in the fourth phase φ4.

In a fifth phase 5, the second switch K2 and the fifth switch K5 are switched on, and the first switch K1, the third switch K3, the fourth switch K4, the sixth switch K6, and the seventh switch K7 are switched off. As shown in FIG. 10E, the voltage of the second terminal N2 of the energy storage capacitor Ce remains at the second negative voltage −V2. The drive electrode TX is connected to the second node T2, negative charges of the second node T2 are transferred to the drive electrode TX, and the voltage of the drive electrode TX becomes the first negative voltage VSS. The drive circuit 100 consumes energy of the power supply in the fifth phase φ5.

In a sixth phase φ6, the fifth switch K5 and the sixth switch K6 are switched on, and the first switch K1, the second switch K2, the third switch K3, the fourth switch K4, and the seventh switch K7 are switched off. The fifth switch K5 is switched on, and the voltage of the first terminal N1 of the energy storage capacitor Ce remains 0. The sixth switch K6 is switched on, and the second terminal N2 of the energy storage capacitor Ce is connected to the drive electrode TX. As shown in FIG. 10F, negative charges on the drive electrode TX are transferred to the second terminal N2 of the energy storage capacitor Ce via the sixth switch K6. The voltage of the drive electrode TX increases from the first negative voltage VSS to a third negative voltage −V3, and the voltage of the second terminal N2 of the energy storage capacitor Ce decreases from the second negative voltage −V2 to the third negative voltage −V3. According to the charge conservation, $|VSS|*Cd+V2*Ce=V3*(Cd+Ce)$ (formula 3). The sixth phase φ6 is a charge storage phase of the energy storage capacitor Ce. Since the first switch K1 and the second switch K2 are switched off, the drive circuit 100 does not consume energy of the power supply in the sixth phase φ6.

In a seventh phase φ7, the third switch K3 and the fourth switch K4 are switched on, and the first switch K1, the second switch K2, the fifth switch K5, the sixth switch K6, and the seventh switch K7 are switched off. As shown in FIG. 10G, the third switch K3 is switched on, the negative charges on the drive electrode TX are released to the ground node through the third switch K3, and the voltage of the drive electrode TX changes from the third negative voltage −V3 to 0. The fourth switch K4 is switched on, the fifth switch K5 is switched off, the voltage of the second terminal N2 of the energy storage capacitor Ce is 0, and the voltage of the first terminal N1 becomes the positive voltage V3. Since the first switch K1 and the second switch K2 are switched off, the drive circuit 100 does not consume energy of the power supply in the seventh phase φ7.

In an eighth phase φ8, the fourth switch K4 and the seventh switch K7 are switched on, and the first switch K1, the second switch K2, the third switch K3, the fifth switch K5, and the sixth switch K6 are switched off. As shown in FIG. 10H, the seventh switch K7 is switched on, the drive electrode TX is connected to the first terminal N1 of the energy storage capacitor Ce, positive charges of the first terminal N1 of the energy storage capacitor Ce are transferred to the drive electrode TX, and the voltage of the drive electrode TX and the voltage of the first terminal N1 of the energy storage capacitor Ce become a third positive voltage V4. The sixth phase φ6 is a charge release phase of the energy storage capacitor Ce. According to the charge conservation, $V3*Ce=V4*(Ce+Cd)$ (formula 4). Since the first switch K1 and the second switch K2 are switched off, the drive circuit 100 does not consume energy of the power supply in the eighth phase φ8.

The drive circuit 100 physically repeats the first phase φ1 to the eighth phase φ8 above. In a first phase φ1 of a next drive cycle T, the first switch K1 and the fourth switch K4 are switched on, and the second switch K2, the third switch K3, the fifth switch K5, the sixth switch K6, and the seventh switch K7 are switched off. As shown in FIG. 10I, the first node T1 charges the drive electrode TX from the third positive voltage V4 to the first positive voltage VCC through the first switch K1, and the voltage of the first terminal N1 of the energy storage capacitor Ce remains at the third positive voltage V4.

Before the drive circuit 100 starts to drive the drive electrode TX, the charges of the first terminal N1 and the second terminal N2 of the energy storage capacitor Ce are 0, and the voltage difference therebetween is 0. Through several early cycles of the driving process, the charges on the energy storage capacitor Ce tend to be stable, and the drive signal 100 is in a steady state. As shown in FIG. 11, an eighth phase φ8 of an n-th drive cycle is followed by a first phase φ1 of an (n+1)-th drive cycle. States of the fourth switch K4 and the fifth switch K5 in the first phase φ1 are same as their states in the eighth phase φ8, so that the voltage V0 of the first terminal N1 in the first phase φ1 equals the third positive voltage V4.

In summary, the first terminal N1 of the energy storage capacitor Ce stores positive charges released from the drive electrode TX in the second phase φ2, so that the voltage of the drive electrode TX decreases from the first positive voltage VCC to the second positive voltage V2; the second terminal N2 of the energy storage capacitor Ce transfers negative charges to the drive electrode TX in the fourth phase 4, so that the voltage of the drive electrode TX changes from the zero voltage to the second negative voltage −V2; the second terminal N2 of the energy storage capacitor Ce stores negative charges released from the drive electrode TX in the sixth phase φ6, so that the voltage of the drive electrode TX changes from the first negative voltage VSS to the third negative voltage −V3; and the first terminal N1 of the energy storage capacitor Ce transfers positive charges to the drive electrode TX in the eighth phase φ8, so that the voltage of the drive electrode TX changes from the zero voltage to the third positive voltage V4. The power supply provides charges merely in the first phase φ1 and the fifth phase φ5, thereby reducing the power consumption.

For the drive circuit shown in FIG. 5, the power supply is required to provide energy in each of the process of changing the voltage of the drive electrode TX from the zero voltage to the first positive voltage VCC and the process of changing the voltage of the drive electrode TX from the zero voltage to the first negative voltage VSS. For the drive circuit shown in FIG. 8, the power supply is required to provide charges only in the process of changing the voltage of the drive electrode TX from the third positive voltage V4 to the first positive voltage VCC and the process of changing the voltage of the drive electrode TX from the second negative voltage −V2 to the first negative voltage VSS. Therefore, the drive circuit shown in FIG. 8 reduces the power consumption, compared with the drive circuit shown in FIG. 5.

The schematic drive circuit 100 of FIG. 8 comprises 1 energy storage capacitor Ce, or the drive circuit 100 may comprise a plurality of energy storage capacitors Ce, wherein the plurality of energy storage capacitors are connected in parallel.

As described above, in the eight phases of the drive cycle T, the drive electrode TX is connected to the first node T1, one of the energy storage capacitors Ce, the ground node GND, one of the energy storage capacitors Ce, the second node T2, one of the energy storage capacitors Ce, the ground node GND, and one of the energy storage capacitors Ce successively. At any moment in the drive cycle T, the drive electrode TX is only connected to one of the energy storage capacitors Ce, the first node T1, the second node T2, and the ground node GND. Therefore, in each phase from the first phase to the eighth phase, only one of the first switch K1, the second switch K2, the third switch K3, the sixth switch K6, and the seventh switch K7 is in an on-state to avoid an improper charge transfer path. Since it takes time for a switch to be switched between an on-state and an off-state, after the switching of the switch from the on-state to the off-state is completed in a previous phase, switching of the switch from the off-state to the on-state is started in a next phase. For example, at the boundary of the first stage φ1 and the second stage φ2, if the first switch K1 is switched from the on-state to the off-state, and simultaneously, the seventh switch K7 is switched from the off-state to the on-state, a conduction path from the first node T1 to the first terminal N1 of the energy storage capacitor Ce may be available, to charge the energy storage capacitor Ce by the first node T1, so that the voltage of the first terminal N1 of the energy storage capacitor Ce deviates from a target value, thereby resulting in the circuit failure in working normally.

As shown in FIG. 11, one of the fourth switch K4 and the fifth switch K5 is in the on-state, and the other one is in the off-state. The fourth switch K4 and the fifth switch K5 are controlled by, for example, non-overlapping signals. When the fourth switch K4 is switched between the on-state and the off-state, the sixth switch K6 is in the off-state, thereby preventing the drive electrode TX from being connected to the ground node through the sixth switch K6 and the fourth switch K4. Similarly, when the fifth switch K5 is switched between the on-state and the off-state, the seventh switch K7 is in the off-state.

According to formulas (1) to (4), during each charge transfer (the second phase φ2, the fourth phase φ4, the sixth phase φ6, and the eighth phase φ8) between the energy storage capacitor Ce and the drive electrode TX, the voltage change of the energy storage capacitor Ce depends on the difference value between the capacitance value of the energy storage capacitor Ce and the capacitance value of equivalent capacitance Cd of the drive electrode TX to ground. For example, according to formula (1), the larger the difference value between the capacitance value of the energy storage capacitor Ce and the capacitance value of the equivalent capacitance Cd of the drive electrode TX to ground is, the closer the voltage V0 of the first terminal N1 of the energy storage capacitor Ce in the first phase φ1 is to the voltage (the second positive voltage V1) in the second phase φ2, and the smaller the voltage change of the energy storage capacitor Ce is. The capacitance value of the equivalent capacitance Cd of the drive electrode TX to ground generally remains unchanged. Therefore, the larger the capacitance value of the energy storage capacitor Ce is, the smaller the voltage change of the energy storage capacitor Ce is, and the less the electromagnetic interference (EMI) is caused by the voltage change, the less the drive circuit and other circuits of the touch drive apparatus are affected by the electromagnetic interference.

The amplitude of the first positive voltage VCC is equal the amplitude of the first negative voltage VSS, that is, VSS=−VCC. According to formulas (1) to (4), the amplitude of the second positive voltage V1 equals the amplitude of the third negative voltage −V3, and the amplitude of the second negative voltage −V2 equals the amplitude of the third positive voltage V4. It can be further obtained that:

$$V1 = VCC * \frac{1 + \frac{Cd}{Ce}}{2 + \frac{Cd}{Ce}}$$

$$V4 = VCC * \frac{1}{2 + \frac{Cd}{Ce}}$$

When the capacitance value of the energy storage capacitor Ce is much larger than the capacitance value of the equivalent capacitance Cd of the drive electrode TX to ground, according to the above formulas, the amplitude of the second positive voltage V1 and the amplitude of the third positive voltage V4 are approximately equal to VCC/2. That is, the second positive voltage V1, the second negative voltage −V2, the third negative voltage −V3, and the third positive voltage V4 are VCC/2, −VCC/2, −VCC/2, and VCC/2, respectively.

The larger the ratio of the capacitance value of the energy storage capacitor Ce to the capacitance value of the equivalent capacitance Cd of the drive electrode TX to ground is, the closer the second positive voltage V1 and the third positive voltage V4 are to VCC/2, and the closer the second negative voltage −V2 and the third negative voltage −V3 are to −VCC/2. The voltage on the drive electrode TX may be regarded as a 5-stepped waveform. In some embodiments, the capacitance value of the energy storage capacitor Ce is larger than 50 times as much as the capacitance value of the equivalent capacitance Cd of the drive electrode TX to ground.

Figure 12:
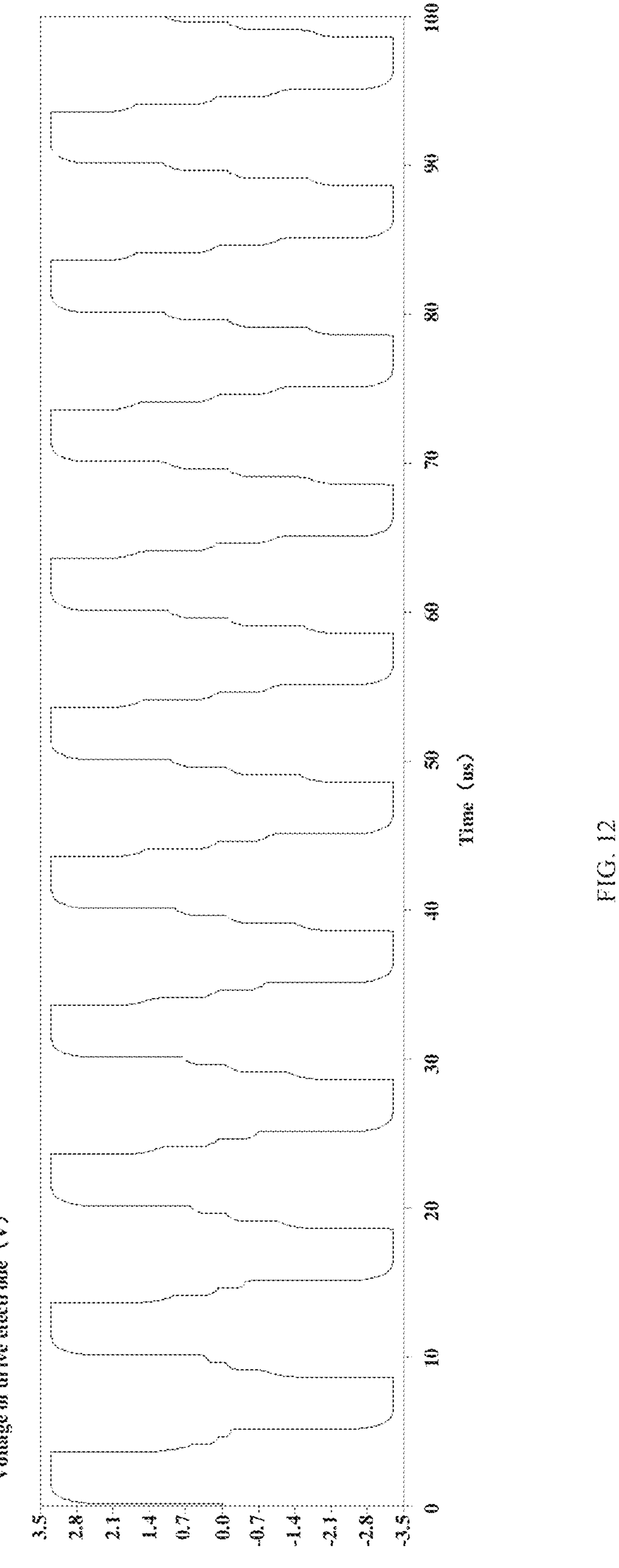
FIG. 12 is a schematic waveform diagram of a drive signal provided by the drive circuit shown in FIG. 8.
Figure 13:
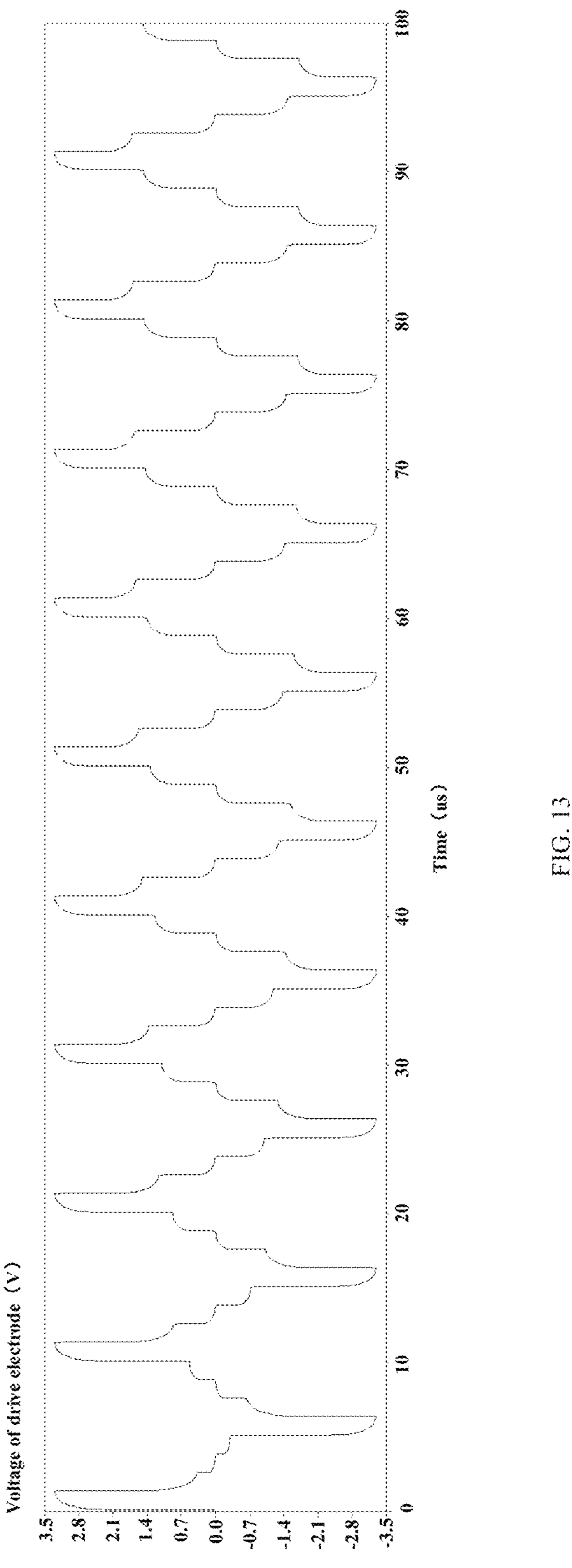
FIG. 13 is a schematic waveform diagram of another drive signal provided by the drive circuit shown in FIG. 8.

The duty ratio of the drive signal (i.e., the voltage on the drive electrode TX) provided by the drive circuit 100 refers to a ratio of time when the magnitude of the drive signal is close to the zero voltage to the drive phase T. The duty ratio of the drive signal can be regulated by conduction time of the third switch K3. The drive circuit shown in FIG. 5 and the drive circuit shown in FIG. 8 are experimentally compared. The magnitude of the capacitance of the energy storage capacitor Cd is set to 9 times as much as the equivalent ground capacitance of the drive electrode TX. The frequency of the drive signal is 100 kHz, that is, the phase T of the drive signal is 10 microseconds. The power consumption of the drive circuit shown in FIG. 5 is 2.23 mW, and the signal amplitude (peak-to-peak value of the voltage of the drive electrode TX) is 56.63 mV. FIG. 12 is a schematic waveform diagram of a drive signal with a duty ratio of 10% provided by the drive circuit shown in FIG. 8. FIG. 13 is a schematic waveform diagram of a drive signal with a duty ratio of 25% provided by the drive circuit shown in FIG. 8. When the drive signal with the duty ratio of 25% is provided, the power consumption of the drive circuit shown in FIG. 8 is 0.742 mW, the signal amplitude is 36.2 mV, and the power consumption is 33% of the drive circuit shown in FIG. 5. When the drive signal with the duty ratio of 10% is provided, the power consumption of the drive circuit shown in FIG. 8 is 0.917 mW, the signal amplitude is 52.52 mV, and the power consumption is 41% of the drive circuit shown in FIG. 5. The experimental result shows that the power consumption of the drive circuit shown in FIG. 8 is reduced.

Figure 14:
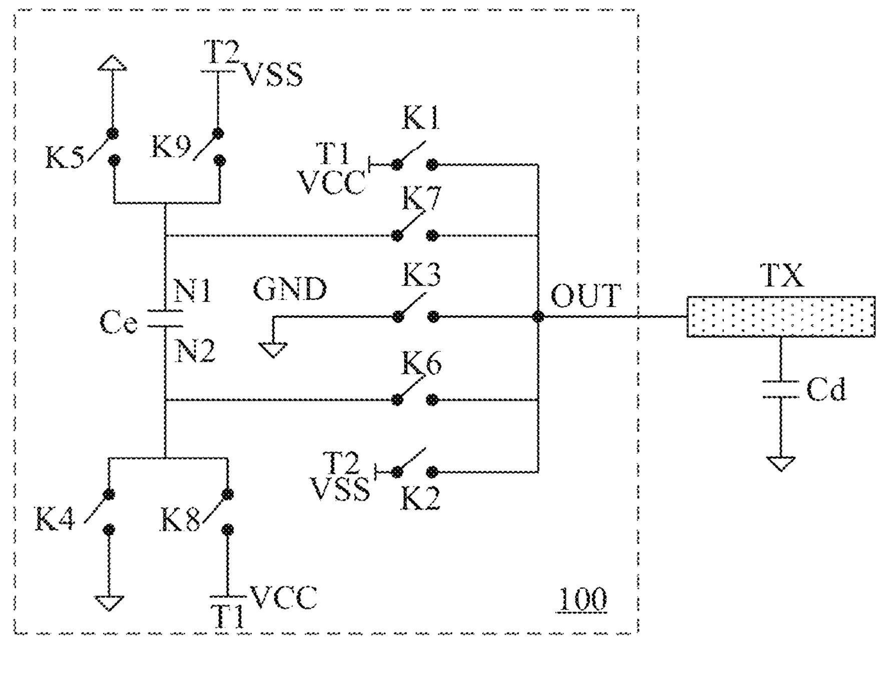
FIG. 14 is a schematic circuit diagram of another drive circuit provided in an embodiment of the present disclosure.

FIG. 14 is a schematic circuit diagram of another drive circuit provided in an embodiment of the present disclosure. As shown in FIG. 14, the drive circuit 100 comprises: a first node T1, a second node T2, a ground node GND, a switch circuit, and an energy storage capacitor Ce. The switch circuit comprises: an output node OUT, a first switch K1, a second switch K2, a third switch K3, a fourth switch K4, a fifth switch K5, a sixth switch K6, a seventh switch K7, an eighth switch K8, and a ninth switch K9. The energy storage capacitor Ce is a discrete capacitor, such as a ceramic capacitor.

Compared with the drive circuit shown in FIG. 8, the drive circuit shown in FIG. 14 further comprises an eighth switch K8 and a ninth switch K9. The ninth switch K9 is arranged between a first terminal N1 of the energy storage capacitor Ce and the second node T2. The eighth switch K8 is arranged between a second terminal N2 of the energy storage capacitor Ce and the first node T1. The eighth switch K8 is, for example, a PMOS transistor, and the ninth switch K9 is, for example, an NMOS transistor.

Figure 15:
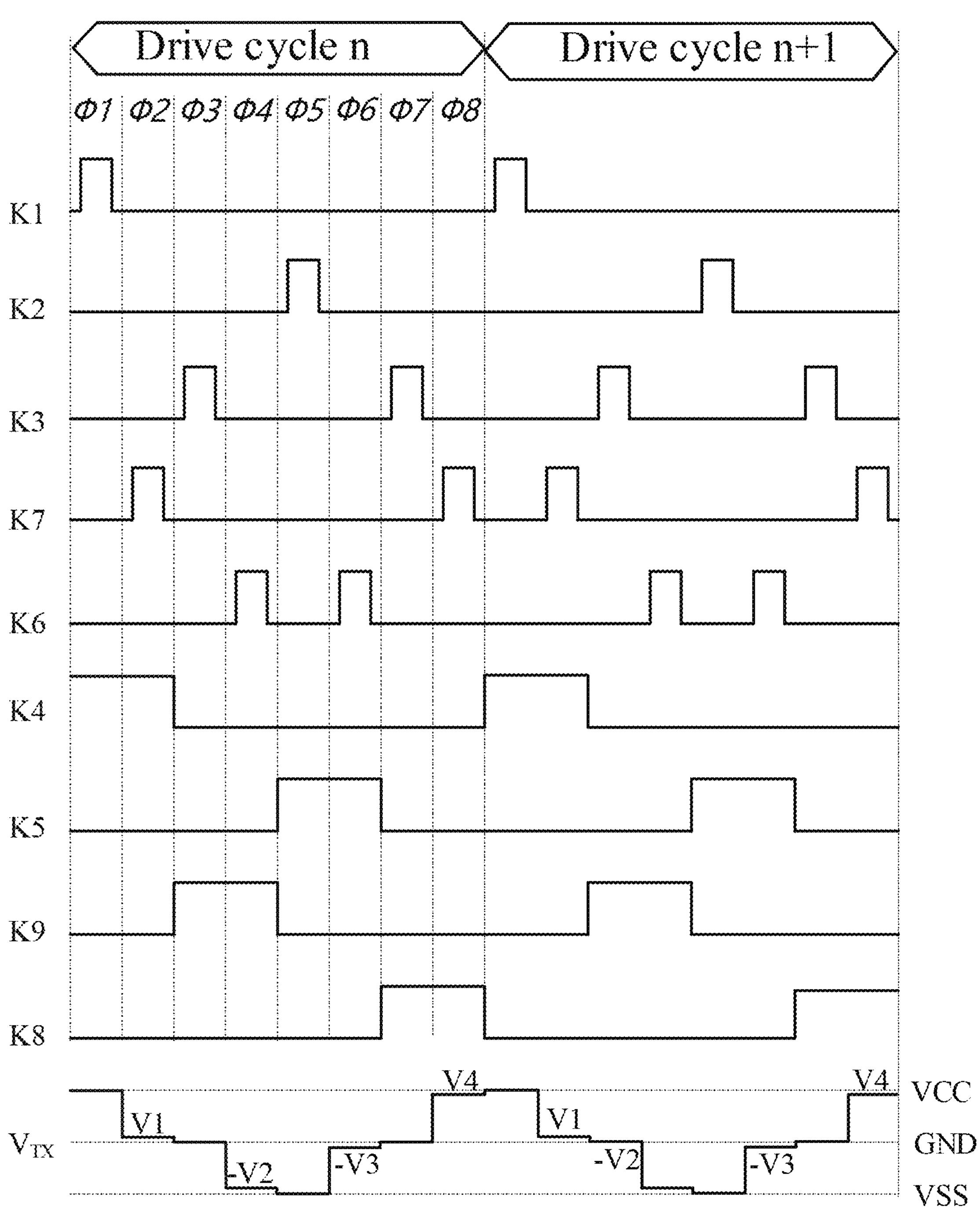
FIG. 15 is a timing diagram of the drive circuit shown in FIG. 12.

FIG. 15 is a timing diagram of the drive circuit shown in FIG. 14. When a high signal corresponds to a switch, it means that the switch is switched on, while when a low signal corresponds to a switch, it means that the switch is switched off. One cycle T of a process of driving a drive electrode TX by the drive circuit 100 includes 8 phases φ1-φ8.

In the first phase φ1, the first switch K1 and the fourth switch K4 are switched on, and the other switches are switched off. The first switch K1 is switched on, and the first node T1 charges the drive electrode TX to a first positive voltage VCC through the first switch K1. The fourth switch K4 is switched on, the second terminal N2 of the energy storage capacitor Ce is grounded, the voltage is zero voltage, and the first terminal N1 has a voltage V0. In the first phase φ1, the drive circuit 100 consumes energy of a power supply.

In the second phase φ2, the fourth switch K4 and the seventh switch K7 are switched on, and the other switches are switched off. The second terminal N2 of the energy storage capacitor Ce is grounded. The seventh switch K7 is switched on, and the first terminal N1 of the energy storage capacitor Ce is connected to the drive electrode TX. The voltage VCC of the drive electrode TX is higher than the voltage V0 of the first terminal N1 of the energy storage capacitor Ce, and positive charges on the drive electrode TX are transferred to the first terminal N1 of the energy storage capacitor Ce via the seventh switch K7. The voltage of the drive electrode TX decreases to a second positive voltage V1, and the voltage of the first terminal N1 of the energy storage capacitor Ce increases to the second positive voltage V1. That is, VCC>V1>V0. The second phase φ2 is a charge storage phase of the energy storage capacitor Ce. According the to charge conservation principle, VCC*Cd+V0*Ce=V1*Cd+V1*Ce (formula 5). The first switch K1 and the second switch K2 are switched off, and the drive circuit 100 does not consume energy of the power supply in the second phase φ2.

In the third phase φ3, the third switch K3 and the ninth switch K9 are switched on, and the other switches are switched off. The ninth switch K9 is switched on, the fourth switch K4 is switched off, the voltage of the first terminal N1 of the energy storage capacitor Ce changes from the second positive voltage V1 to a first negative voltage VSS, and the voltage of the second terminal N2 changes to a negative voltage −V1−|VSS|. The third switch K3 is switched on, positive charges on the drive electrode TX are released to the ground node, and the voltage of the drive electrode TX decreases to the zero voltage. The first switch K1 and the second switch K2 are switched off, and the drive circuit 100 does not consume energy of the power supply in the third phase φ3.

In the fourth phase φ4, the sixth switch K6 and the ninth switch K9 are switched on, and the other switches are switched off. The ninth switch K9 is switched on, and the voltage of the first terminal N1 of the energy storage capacitor Ce remains at the first negative voltage VSS. The sixth switch K6 is switched on, and the second terminal N2 of the energy storage capacitor Ce is connected to the drive electrode TX. Negative charges of the second terminal N2 of the energy storage capacitor Ce are transferred to the drive electrode TX via the sixth switch K6 to charge the drive electrode TX, until the second terminal N2 of the energy storage capacitor Ce and the drive electrode TX have an equal voltage. The voltage of the drive electrode TX decreases from the zero voltage to a second negative voltage −V2, and the voltage of the second terminal N2 of the energy storage capacitor Ce increases from −V1−|VSS| to the second negative voltage −V2, that is: −V1−|VSS|<−V2<0. According to the charge conservation principle, V2*Cd=(|VSS|−V2)*Ce+V1*Ce (formula 6). The fourth phase φ4 is a charge release phase of the energy storage capacitor Ce.

In the fifth phase φ5, the second switch K2 and the fifth switch K5 are switched on, and the other switches are switched off. The second switch K2 is switched on, the drive electrode TX is connected to the second node T2, negative charges of the second node T2 are transferred to the drive electrode TX, and the voltage of the drive electrode TX decreases from the second negative voltage −V2 to the first negative voltage VSS. The drive circuit 100 consumes energy of the power supply in the fifth phase φ5. The fifth switch K5 is switched on, the voltage of the first terminal N1 of the energy storage capacitor Ce changes from the first negative voltage VSS to the zero voltage, and the voltage of the second terminal N2 of the energy storage capacitor Ce changes from the second negative voltage −V2 to a positive voltage |VSS|−V2.

In the sixth phase φ6, the sixth switch K6 and the fifth switch K5 are switched on, and the other switches are switched off. The fifth switch K5 is switched on, and the first terminal N1 of the energy storage capacitor Ce remains at the zero voltage. The sixth switch K6 is switched on, the second terminal N2 of the energy storage capacitor Ce is connected to the drive electrode TX, and the negative charges on the drive electrode TX are transferred to the second terminal N2 of the energy storage capacitor Ce via the sixth switch K6. The voltage of the drive electrode TX increases from the first negative voltage VSS to a third negative voltage −V3. The voltage of the second terminal N2 of the energy storage capacitor Ce changes from |VSS|−V2 to the third negative voltage −V3. According to the charge conservation principle, |VSS|*Cd=V3*Cd+V3*Ce+(|VSS|−V2)*Ce (formula 7). The sixth phase φ6 is a charge storage phase of the energy storage capacitor Ce.

In the seventh phase φ7, the third switch K3 and the eighth switch K8 are switched on, and the other switches are switched off. The third switch K3 is switched on, and the negative charges on the drive electrode TX are released to the ground node. The voltage of the drive electrode TX changes from the third negative voltage −V3 to the zero voltage. The eighth switch K8 is switched on, the voltage of the second terminal N2 of the energy storage capacitor Ce changes from the third negative voltage −V3 to the first positive voltage VCC, and the voltage of the first terminal N1 changes from the zero voltage to VCC+V3.

In the eighth phase φ8, the seventh switch K7 and the eighth switch K8 are switched on, and the other switches are switched off. The eighth switch K8 is switched on, and the voltage of the second terminal N2 of the energy storage capacitor Ce remains at the first positive voltage VCC. The seventh switch K7 is switched on, the first terminal N1 of the energy storage capacitor Ce is connected to the drive electrode TX, and positive charges of the first terminal N1 of the energy storage capacitor Ce are transferred to the drive electrode TX through the seventh switch K7. The voltage of the drive electrode TX increases from the zero voltage to a third positive voltage V4. The voltage of the first terminal N1 of the energy storage capacitor Ce decreases from VCC+V3 to the third positive voltage V4. The eighth phase φ8 is a charge release phase of the energy storage capacitor Ce. According to the charge conservation principle, V3*Ce=(VCC−V4)*Ce+V4*Cd (formula 8).

Before the drive circuit 100 starts to drive the drive electrode TX, the charges of the first terminal N1 and the second terminal N2 of the energy storage capacitor Ce are 0, and the voltage difference therebetween is 0. Through several early cycles of the driving process, the charges on the energy storage capacitor Ce tend to be stable, and the drive signal 100 is in a steady state. As shown in FIG. 15, an eighth phase φ8 of an n-th drive cycle is followed by a first phase φ1 of an (n+1)-th drive cycle. The eighth switch K8 is switched on in the eighth phase φ8, and the fourth switch K4 is switched on in the first phase φ1. Therefore, the voltage of the first terminal N1 in the first phase φ1 is VCC lower than the voltage in the eighth phase φ8, that is, V0 equals V4−VCC. Therefore, VCC*Cd+ (V4−Vcc) *Ce=V1*Cd+V1*Ce (formula 9) can be obtained according to formula (5).

As shown in FIG. 15, at any time in the drive cycle, one of the fourth switch K4, the fifth switch K5, the eighth switch K8, and the ninth switch K9 is in an on-state, and the other three are in an off-state.

In summary, the first terminal N1 of the energy storage capacitor Ce stores positive charges released from the drive electrode TX in the second phase φ2, so that the voltage of the drive electrode TX decreases from the first positive voltage VCC to the second positive voltage V2; the second terminal N2 of the energy storage capacitor Ce transfers negative charges to the drive electrode TX in the fourth phase φ4, so that the voltage of the drive electrode TX decreases from the zero voltage to the second negative voltage −V2; the second terminal N2 of the energy storage capacitor Ce stores negative charges released from the drive electrode TX in the sixth phase φ6, so that the voltage of the drive electrode TX increases from the first negative voltage VSS to the third negative voltage −V3; and the first terminal N1 of the energy storage capacitor Ce transfers positive charges to the drive electrode TX in the eighth phase φ8, so that the voltage of the drive electrode TX increases from the zero voltage to the third positive voltage V4.

The amplitude of the first positive voltage VCC is equal the amplitude of the first negative voltage VSS, that is, VSS=−VCC. According to formulas (5) to (9), the amplitude of the first positive voltage V1 equals the amplitude of the third negative voltage −V3, and the amplitude of the second negative voltage −V2 equals the amplitude of a fourth positive voltage V4. Further, according to formulas (6) to (9), when the capacitance value of the energy storage capacitor Ce is much larger than the capacitance value of an equivalent capacitance Cd of the drive electrode TX to ground, the first positive voltage V1 is slightly higher than the zero voltage, the third negative voltage −V3 is slightly lower than the zero voltage, the second negative voltage −V2 is slightly higher than −VCC, and the third positive voltage V4 is slightly lower than VCC. The larger the ratio of the capacitance value of the energy storage capacitor Ce to the capacitance value of the equivalent capacitance Cd of the drive electrode TX to ground is, the closer the first positive voltage V1 and the third negative voltage −V3 are to the zero voltage, and the closer the second negative voltage −V2 is to −VCC, the closer the third positive voltage V4 is to VCC. The voltage on the drive electrode TX is as shown in FIG. 15, and the voltage on the drive electrode TX may be regarded as a 3-stepped waveform. In some embodiments, the capacitance value of the energy storage capacitor Ce is larger than 5 times as much as the capacitance value of the equivalent capacitance Cd of the drive electrode TX to ground.

Due to the large capacitance value of the energy storage capacitor Ce, the switch circuit is fabricated on a bare chip (die). The energy storage capacitor Ce is located outside the bare chip.

Figure 16:
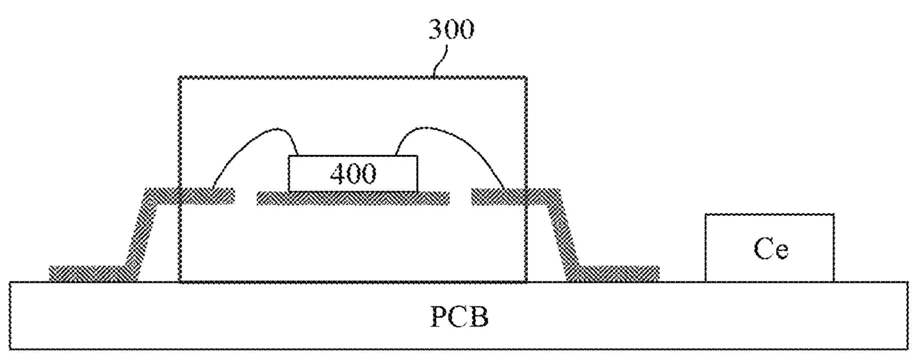
FIG. 16 is a schematic encapsulation diagram of a touch drive apparatus provided in an embodiment of the present disclosure.
Figure 17:
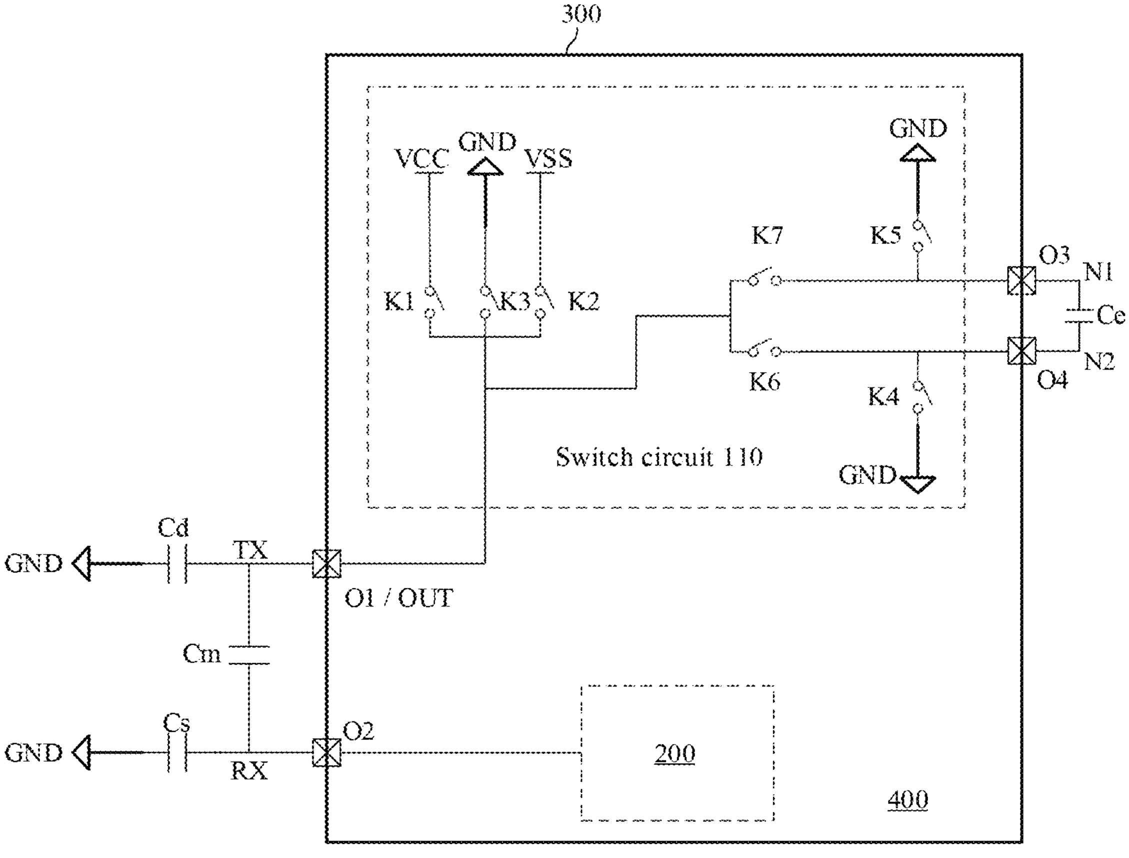
FIG. 17 is a schematic block diagram of the touch drive apparatus shown in FIG. 16.

In some embodiments, the bare chip where the switch circuit is located is encapsulated separately. FIG. 16 is a schematic encapsulation diagram of a touch drive apparatus provided in an embodiment of the present disclosure. FIG. 17 is a schematic block diagram of the touch drive apparatus shown in FIG. 16. As shown in FIGS. 16 and 17, a bare chip 400 where a switch circuit is located is encapsulated in a case 300. The bare chip 400 is encapsulated, for example, in a ball grid array. The encapsulated bare chip 400 has pins O1-O4. The encapsulated bare chip 400 and an energy storage capacitor Ce are both arranged on a printed circuit board (PCB). The encapsulated bare chip 400 is connected to the energy storage capacitor Ce through a layout of the printed circuit board (PCB). An output node OUT of a drive circuit 100 is connected to a drive electrode TX through the pin O1. For example, the output node OUT is connected to the pin O1 through a gold wire, and the pin O1 is connected to the drive electrode TX through the layout of the printed circuit board (PCB). A detection circuit 200 is also formed on the bare chip 400, and the detection circuit 200 is connected to a detection electrode RX through the pin O2. A first terminal N1 of the energy storage capacitor Ce is connected to the pin O3 through the layout of the printed circuit board (PCB), and a second terminal N2 is connected to the pin O4 through the layout of the printed circuit board (PCB). The drive circuit in FIG. 17 is, for example, the drive circuit shown in FIG. 8.

Figure 18:
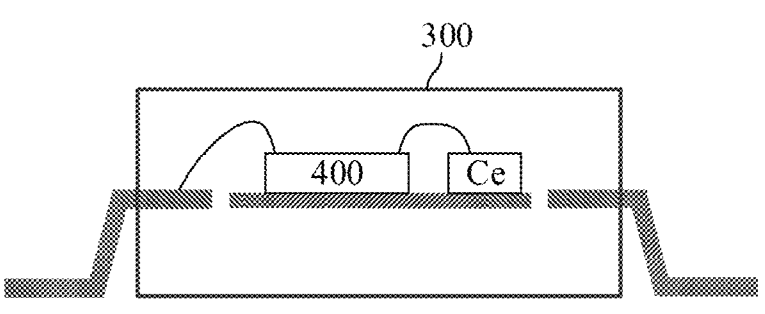
FIG. 18 is a schematic encapsulation diagram of another touch drive apparatus provided in an embodiment of the present disclosure.

In some other embodiments, the energy storage capacitor Ce is encapsulated together with the bare chip 400 where the switch circuit is located, that is, the energy storage capacitor Ce and the bare chip 400 where the switch circuit is located are encapsulated together. FIG. 18 is a schematic encapsulation diagram of another touch drive apparatus provided in an embodiment of the present disclosure. A bare chip 400 where a switch circuit is located and an energy storage capacitor Ce are both encapsulated in a case 300. The bare chip 400 where the switch circuit is located and the energy storage capacitor Ce are encapsulated, for example, in a ball grid array. A first terminal N1 and a second terminal N2 of the energy storage capacitor Ce are connected to the switch circuit through a gold wire. The bare chip 400 where the switch circuit is located and the energy storage capacitor Ce are encapsulated together, thereby saving pins of a touch drive chip.

While the above description merely provides specific embodiments of the present disclosure, the scope of protection of the present disclosure is not limited to the specific embodiments. Any person skilled in the art may easily conceive of various equivalent modifications or replacements within the technical scope disclosed in the present disclosure. All these modifications or replacements should be encompassed within the scope of protection of the present disclosure. Therefore, the scope of protection of the present disclosure shall be determined by the scope of protection of the claims.

The invention claimed is:

1. A drive circuit, applicable to a touch screen, the touch screen comprising a drive electrode, the drive circuit comprising:

a first node configured to provide a first positive voltage;

a second node configured to provide a first negative voltage;

a ground node;

an energy storage capacitor comprising a first terminal and a second terminal; and a switch circuit configured to control the first terminal of the energy storage capacitor to be selectively connected to the ground node and selectively connected to the drive electrode, and control the second terminal of the energy storage capacitor to be selectively connected to the ground node and selectively connected to the drive electrode, wherein the switch circuit comprises:

an output node provided for connection to the drive electrode;

a first switch provided between the first node and the output node;

a second switch provided between the second node and the output node;

a third switch provided between the ground node and the output node;

a fourth switch provided between the ground node and the second terminal of the energy storage capacitor;

a fifth switch provided between the ground node and the first terminal of the energy storage capacitor;

a sixth switch provided between the ground node and the second terminal of the energy storage capacitor; and a seventh switch provided between the ground node and the first terminal of the energy storage capacitor.

2. The drive circuit according to claim 1, wherein the switch circuit is configured to control, in a first phase, the drive electrode to be connected to the first node to charge the drive electrode via the first node, so that voltage of the drive electrode equals the first positive voltage;

control, in a second phase, the drive electrode to be connected to the first terminal of the energy storage capacitor to store charges released from the drive electrode in the energy storage capacitor, so that the voltage of the drive electrode equals a second positive voltage;

control, in a third phase, the drive electrode to be connected to the ground node, so that the voltage of the drive electrode equals zero voltage;

control, in a fourth phase, the drive electrode to be connected to the second terminal of the energy storage capacitor to transfer charges from the energy storage capacitor to the drive electrode, so that the voltage of the drive electrode equals a second negative voltage; and control, in a fifth phase, the drive electrode to be connected to the second node to charge the drive electrode via the second node, so that the voltage of the drive electrode equals the first negative voltage, wherein the second positive voltage is lower than the first positive voltage and higher than the zero voltage; and the second negative voltage is higher than the first negative voltage and lower than the zero voltage.

3. The drive circuit according to claim 2, wherein the switch circuit controls the second terminal of the energy storage capacitor to be connected to the ground node in the second phase; and the switch circuit controls the first terminal of the energy storage capacitor to be connected to the ground node in the fourth phase.

4. The drive circuit according to claim 3, wherein the switch circuit is further configured to control, in a sixth phase, the drive electrode to be connected to the second terminal of the energy storage capacitor to store the charges released from the drive electrode in the energy storage capacitor, so that the voltage of the drive electrode equals a third negative voltage;

control, in a seventh phase, the drive electrode to be connected to the ground node, so that the voltage of the drive electrode equals the zero voltage; and control, in an eighth phase, the drive electrode to be connected to the first terminal of the energy storage capacitor to transfer charges from the energy storage capacitor to the drive electrode, so that the voltage of the drive electrode equals a third positive voltage, wherein the switch circuit controls the first terminal of the energy storage capacitor to be connected to the ground node in the sixth phase; and the switch circuit controls the second terminal of the energy storage capacitor to be connected to the ground node in the eighth phase.

5. The drive circuit according to claim 1, wherein in the first phase, the first switch and the fourth switch are switched on, and the second switch, the third switch, the fifth switch, the sixth switch, and the seventh switch are switched off;

in the second phase, the fourth switch and the seventh switch are switched on, and the first switch, the second switch, the third switch, the fifth switch, and the sixth switch are switched off;

in the third phase, the third switch and the fifth switch are switched on, and the first switch, the second switch, the fourth switch, the sixth switch, and the seventh switch are switched off;

in the fourth phase, the fifth switch and the sixth switch are switched on, and the first switch, the second switch, the third switch, the fourth switch, and the seventh switch are switched off;

in the fifth phase, the second switch and the fifth switch are switched on, and the first switch, the third switch, the fourth switch, the sixth switch, and the seventh switch are switched off;

in the sixth phase, the fifth switch and the sixth switch are switched on, and the first switch, the second switch, the third switch, the fourth switch, and the seventh switch are switched off;

in the seventh phase, the third switch and the fourth switch are switched on, and the first switch, the second switch, the fifth switch, the sixth switch, and the seventh switch are switched off; and in the eighth phase, the fourth switch and the seventh switch are switched on, and the first switch, the second switch, the third switch, the fifth switch, and the sixth switch are switched off.

6. The drive circuit according to claim 2, wherein the switch circuit controls the second terminal of the energy storage capacitor to be connected to the ground node in the second phase; and the switch circuit controls the first terminal of the energy storage capacitor to be connected to the second node in the fourth phase.

7. The drive circuit according to claim 6, wherein the switch circuit is further configured to control, in a sixth phase, the drive electrode to be connected to the second terminal of the energy storage capacitor to store the charges released from the drive electrode in the energy storage capacitor, so that the voltage of the drive electrode equals a third negative voltage;

control, in a seventh phase, the drive electrode to be connected to the ground node, so that the voltage of the drive electrode equals the zero voltage; and control, in an eighth phase, the drive electrode to be connected to the first terminal of the energy storage capacitor to transfer charges from the energy storage capacitor to the drive electrode, so that the voltage of the drive electrode equals a third positive voltage, wherein the switch circuit controls the first terminal of the energy storage capacitor to be connected to the ground node in the sixth phase; and the switch circuit controls the second terminal of the energy storage capacitor to be connected to the first node in the eighth phase.

8. The drive circuit according to claim 7, wherein the switch circuit comprises:

an eighth switch provided between the second terminal of the energy storage capacitor and the first node; and a ninth switch provided between the first terminal of the energy storage capacitor and the second node.

9. The drive circuit according to claim 8, wherein in the first phase, the first switch and the fourth switch are switched on, and the second switch, the third switch, the fifth switch, the sixth switch, the seventh switch, the eighth switch, and the ninth switch are switched off;

in the second phase, the fourth switch and the seventh switch are switched on, and the first switch, the second switch, the third switch, the fifth switch, the sixth switch, the eighth switch, and the ninth switch are switched off;

in the third phase, the third switch and the ninth switch are switched on, and the first switch, the second switch, the fourth switch, the fifth switch, the sixth switch, the seventh switch, and the eighth switch are switched off;

in the fourth phase, the sixth switch and the ninth switch are switched on, and the first switch, the second switch, the third switch, the fourth switch, the fifth switch, the seventh switch, and the eighth switch are switched off;

in the fifth phase, the second switch and the fifth switch are switched on, and the first switch, the third switch, the fourth switch, the sixth switch, the seventh switch, the eighth switch, and the ninth switch are switched off;

in the sixth phase, the fifth switch and the sixth switch are switched on, and the first switch, the second switch, the third switch, the fourth switch, the seventh switch, the eighth switch, and the ninth switch are switched off;

in the seventh phase, the third switch and the eighth switch are switched on, and the first switch, the second switch, the fourth switch, the fifth switch, the sixth switch, the seventh switch, and the ninth switch are switched off; and in the eighth phase, the seventh switch and the eighth switch are switched on, and the first switch, the second switch, the third switch, the fourth switch, the fifth switch, the sixth switch, and the ninth switch are switched off.

10. The drive circuit according to claim 1, wherein a capacitance value of the energy storage capacitor is larger than a capacitance value of an equivalent capacitance of the drive electrode to ground.

11. A touch drive apparatus, comprising a drive circuit applicable to a touch screen, the touch screen comprising a drive electrode, the drive circuit comprising:

a first node configured to provide a first positive voltage;

a second node configured to provide a first negative voltage;

a ground node;

an energy storage capacitor comprising a first terminal and a second terminal; and a switch circuit configured to control the first terminal of the energy storage capacitor to be selectively connected to the ground node and selectively connected to the drive electrode, and control the second terminal of the energy storage capacitor to be selectively connected to the ground node and selectively connected to the drive electrode, wherein the switch circuit comprises:

an output node provided for connection to the drive electrode;

a first switch provided between the first node and the output node;

a second switch provided between the second node and the output node;

a third switch provided between the ground node and the output node;

a fourth switch provided between the ground node and the second terminal of the energy storage capacitor;

a fifth switch provided between the ground node and the first terminal of the energy storage capacitor:

a sixth switch provided between the ground node and the second terminal of the energy storage capacitor; and a seventh switch provided between the ground node and the first terminal of the energy storage capacitor.

12. The touch drive apparatus according to claim 11, wherein the switch circuit is configured to control, in a first phase, the drive electrode to be connected to the first node to charge the drive electrode via the first node, so that voltage of the drive electrode equals the first positive voltage;

control, in a second phase, the drive electrode to be connected to the first terminal of the energy storage capacitor to store charges released from the drive electrode in the energy storage capacitor, so that the voltage of the drive electrode equals a second positive voltage;

control, in a third phase, the drive electrode to be connected to the ground node, so that the voltage of the drive electrode equals zero voltage;

control, in a fourth phase, the drive electrode to be connected to the second terminal of the energy storage capacitor to transfer charges from the energy storage capacitor to the drive electrode, so that the voltage of the drive electrode equals a second negative voltage; and control, in a fifth phase, the drive electrode to be connected to the second node to charge the drive electrode via the second node, so that the voltage of the drive electrode equals the first negative voltage, wherein the second positive voltage is lower than the first positive voltage and higher than the zero voltage; and the second negative voltage is higher than the first negative voltage and lower than the zero voltage.

13. The touch drive apparatus according to claim 12, wherein the switch circuit controls the second terminal of the energy storage capacitor to be connected to the ground node in the second phase; and the switch circuit controls the first terminal of the energy storage capacitor to be connected to the ground node in the fourth phase.

14. The touch drive apparatus according to claim 13, wherein the switch circuit is further configured to control, in a sixth phase, the drive electrode to be connected to the second terminal of the energy storage capacitor to store the charges released from the drive electrode in the energy storage capacitor, so that the voltage of the drive electrode equals a third negative voltage;

control, in a seventh phase, the drive electrode to be connected to the ground node, so that the voltage of the drive electrode equals the zero voltage; and control, in an eighth phase, the drive electrode to be connected to the first terminal of the energy storage capacitor to transfer charges from the energy storage capacitor to the drive electrode, so that the voltage of the drive electrode equals a third positive voltage, wherein the switch circuit controls the first terminal of the energy storage capacitor to be connected to the ground node in the sixth phase; and the switch circuit controls the second terminal of the energy storage capacitor to be connected to the ground node in the eighth phase.

15. The touch drive apparatus according to claim 11, wherein the switch circuit of the drive circuit is formed on a bare chip, wherein the energy storage capacitor and the bare chip are encapsulated together, or the energy storage capacitor is arranged outside encapsulation of the bare chip.

16. An electronic device, comprising a touch screen and a touch drive apparatus, the touch drive apparatus comprising a drive circuit applicable to a touch screen, the touch screen comprising a drive electrode, the drive circuit comprising:

a first node configured to provide a first positive voltage;

a second node configured to provide a first negative voltage;

a ground node;

an energy storage capacitor comprising a first terminal and a second terminal; and a switch circuit configured to control the first terminal of the energy storage capacitor to be selectively connected to the ground node and selectively connected to the drive electrode, and control the second terminal of the energy storage capacitor to be selectively connected to the ground node and selectively connected to the drive electrode, wherein the switch circuit comprises:

an output node provided for connection to the drive electrode;

a first switch provided between the first node and the output node;

a second switch provided between the second node and the output node;

a third switch provided between the ground node and the output node;

a fourth switch provided between the ground node and the second terminal of the energy storage capacitor;

a fifth switch provided between the ground node and the first terminal of the energy storage capacitor;

a sixth switch provided between the ground node and the second terminal of the energy storage capacitor; and a seventh switch provided between the ground node and the first terminal of the energy storage capacitor.

* * * * *